US012720502B2

(12) United States Patent
Khoryaev et al.

(10) Patent No.: US 12,720,502 B2
(45) Date of Patent: Aug. 25, 2026

(54) REFERENCE CONFIGURATION DETERMINATION FOR INTER-UE COORDINATION FEEDBACK FOR NR V2X SIDELINK COMMUNICATION WITH COLLISION AVOIDANCE

(71) Applicant: Intel Corporation, Santa Clara, CA (US)

(72) Inventors: Alexey Khoryaev, Nizhny Novgorod (RU); Mikhail Shilov, Nizhny Novgorod (RU); Sergey Panteleev, Maynooth (IE); Kilian Peter Anton Roth, Munich (DE); Dmitry Belov, Nizhny Novgorod (RU); Artyom Lomayev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 441 days.

(21) Appl. No.: 18/567,870

(22) PCT Filed: Aug. 3, 2022

(86) PCT No.: PCT/US2022/039317

§ 371 (c)(1),
(2) Date: Dec. 7, 2023

(87) PCT Pub. No.: WO2023/014820

PCT Pub. Date: Feb. 9, 2023

(65) Prior Publication Data

US 2024/0292378 A1 Aug. 29, 2024

Related U.S. Application Data

(60) Provisional application No. 63/230,017, filed on Aug. 5, 2021, provisional application No. 63/230,010, filed (Continued)

(51) Int. Cl.
*H04W 72/02* (2009.01)
*H04L 5/00* (2006.01)

(Continued)

(52) U.S. Cl.
CPC ........... *H04W 72/02* (2013.01); *H04L 5/0051* (2013.01); *H04W 72/25* (2023.01); *H04W 72/563* (2023.01)

(58) Field of Classification Search
CPC ....... H04W 4/40; H04W 72/02; H04W 72/25; H04W 72/40; H04W 72/563; H04W 92/18; H04L 5/0051

(Continued)

(56) References Cited

U.S. PATENT DOCUMENTS

| | | | | |
|---|---|---|---|---|
| 12,603,729 B2 * | 4/2026 | Matsuda | .............. | H04L 1/1812 |
| 2015/0215903 A1 * | 7/2015 | Zhao | ..................... | H04W 72/04 370/329 |

(Continued)

FOREIGN PATENT DOCUMENTS

| | | |
|---|---|---|
| CN | 117529963 A | 2/2024 |
| WO | WO-2023014820 A1 | 2/2023 |

OTHER PUBLICATIONS

"3GPP TSG RAN WG1 Meeting #105-e R1-2104237", 28 pgs.

(Continued)

*Primary Examiner* — Joseph Arevalo
(74) *Attorney, Agent, or Firm* — Shwegman Lundberg & Woessner, P.A.

(57) ABSTRACT

An apparatus and system for new radio (NR) vehicle-to-everything (V2X) sidelink communications are described. A UE receives, from an assisting UE, inter-UE coordination feedback that contains a preferred resource set and a non-preferred resource set based on a reference configuration and uses preferred resources for the V2X sidelink communica- (Continued)

tions. The preferred resources are dependent on the reference configuration and a resource selection configuration of the UE.

17 Claims, 23 Drawing Sheets

Related U.S. Application Data on Aug. 5, 2021, provisional application No. 63/229,970, filed on Aug. 5, 2021.

(51) Int. Cl.
*H04W 72/25* (2023.01)
*H04W 72/563* (2023.01)

(58) Field of Classification Search
USPC ....... 370/318, 252, 329, 311, 230, 279, 310, 370/315, 331
See application file for complete search history.

(56) References Cited

U.S. PATENT DOCUMENTS

2017/0188391 A1* 6/2017 Rajagopal ......... H04W 74/0816
2021/0021387 A1* 1/2021 Chae ..................... H04L 5/0048
2021/0160849 A1* 5/2021 Sun ..................... H04W 72/046
2021/0227622 A1 7/2021 Kung et al.
2021/0314917 A1* 10/2021 Lee ....................... H04W 72/02
2022/0116915 A1* 4/2022 Zhou ..................... H04L 5/0053
2022/0294569 A1* 9/2022 Matsuda ............... H04L 1/1812
2023/0300859 A1* 9/2023 Horiuchi ............... H04W 72/25 370/252
2024/0314748 A1* 9/2024 Ko ...................... H04W 72/115

OTHER PUBLICATIONS

"3GPP TSG RAN WG1 Meeting #105-e R1-2104927", 18 pgs.
"3GPP TSG RAN WG1 Meeting #105-e R1-2105067", 20 pgs.
"3GPP TSG RAN WG1 Meeting #105-e R1-2106570", 15 pgs.
"International Application Serial No. PCT/US2022/039317, International Search Report mailed Nov. 25, 2022".
"International Application Serial No. PCT/US2022/039317, Written Opinion mailed Nov. 25, 2022".
"International Application Serial No. PCT/US2022/039317, International Preliminary Report on Patentability mailed Feb. 15, 2024", 7 pgs.

* cited by examiner

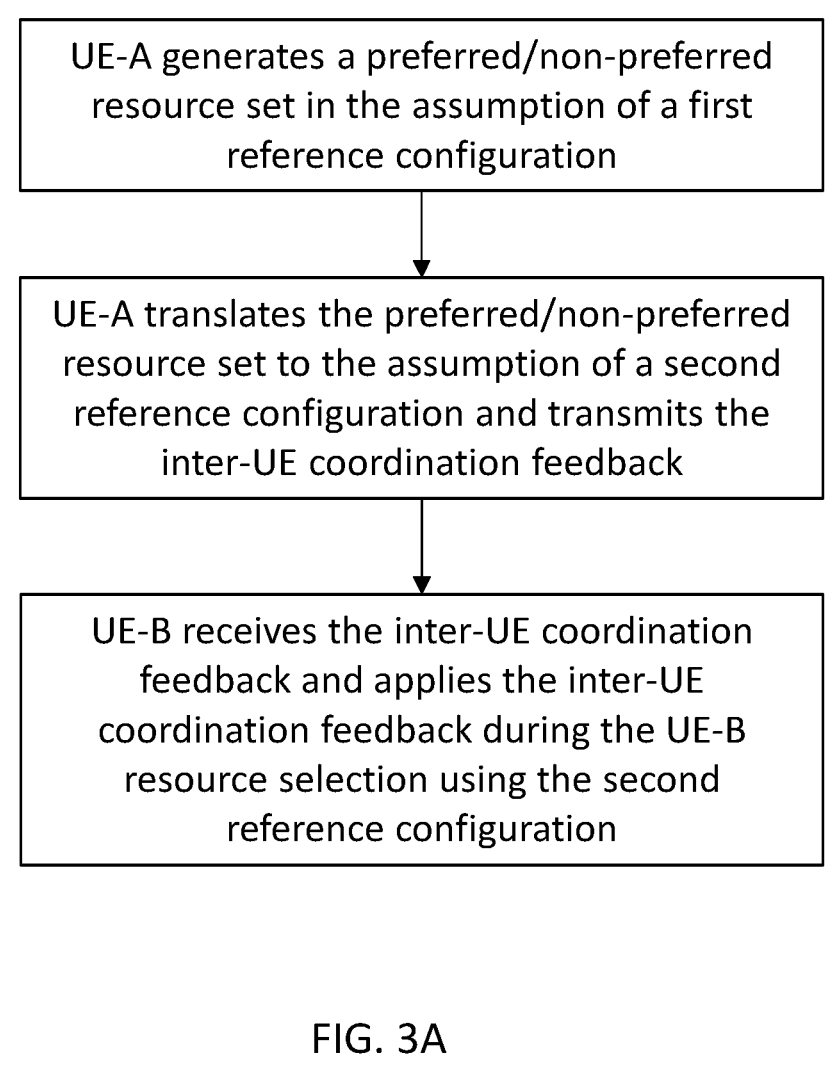

UE-A generates a preferred/non-preferred resource set in the assumption of a first reference configuration UE-A translates the preferred/non-preferred resource set to the assumption of a second reference configuration and transmits the inter-UE coordination feedback UE-B receives the inter-UE coordination feedback and applies the inter-UE coordination feedback during the UE-B resource selection using the second reference configuration

FIG. 3A

REFERENCE CONFIGURATION DETERMINATION FOR INTER-UE COORDINATION FEEDBACK FOR NR V2X SIDELINK COMMUNICATION WITH COLLISION AVOIDANCE

PRIORITY CLAIM

This application is a U.S. National Stage Filing under 35 U.S.C. 371 from International Application No. PCT/US2022/039317, filed Aug. 3, 2022 and published in English as WO 2023/014820 on Feb. 9, 2023, which claims the benefit of priority to U.S. Provisional Patent Application Ser. No. 63/229,970, filed Aug. 5, 2021, U.S. Provisional Patent Application Ser. No. 63/230,010, filed Aug. 5, 2021, and U.S. Provisional Patent Application Ser. No. 63/230,017, filed Aug. 5, 2021, each of which is incorporated herein by reference in its entirety.

TECHNICAL FIELD

Embodiments pertain to next generation (NG) wireless communications. In particular, some embodiments relate to new radio (NR) vehicle-to-everything (V2X) sidelink communications.

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities and vehicle communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3A illustrates translation of the preferred/non-preferred resources from a first reference configuration to a second reference configuration at the UE-A side in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
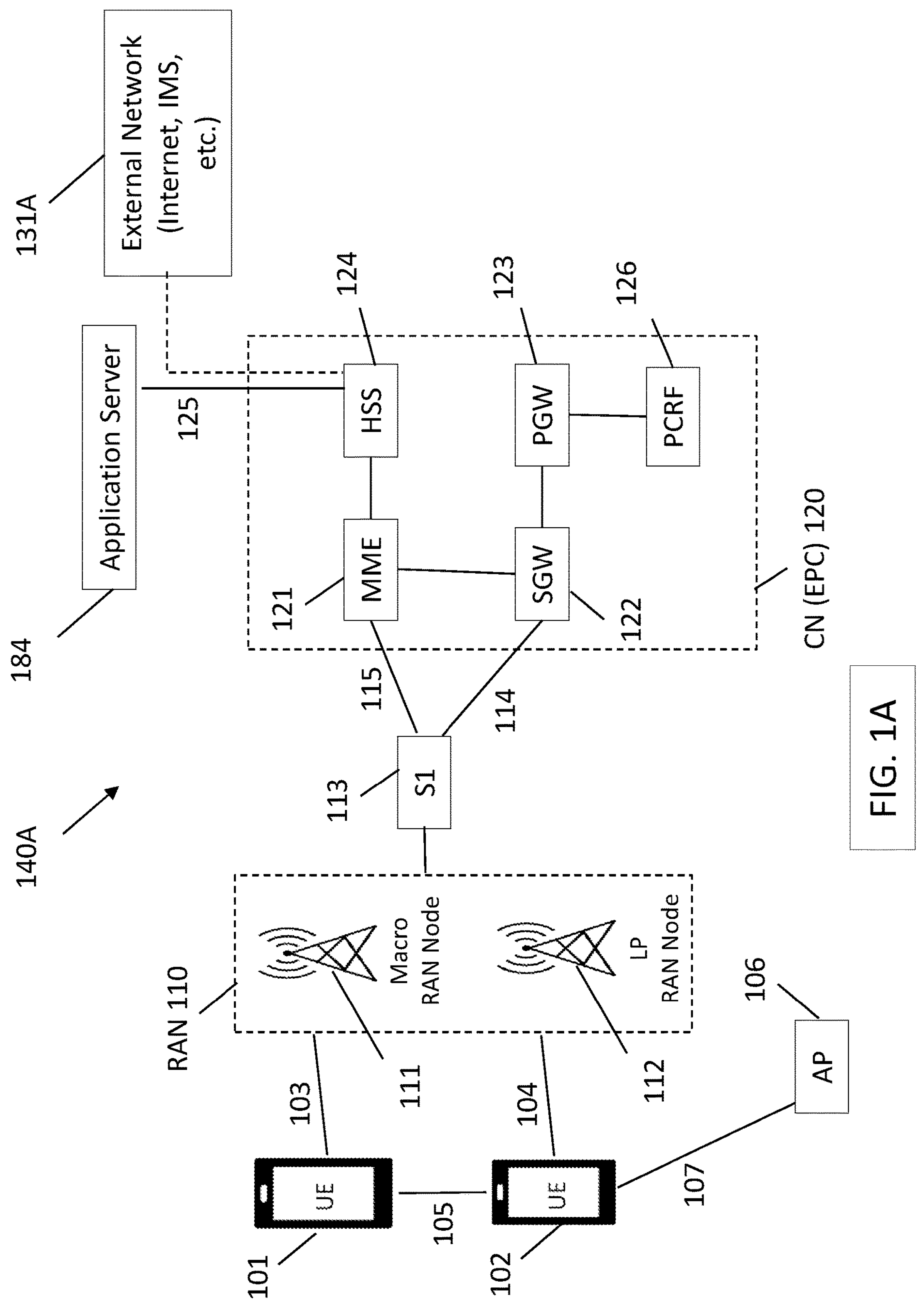
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
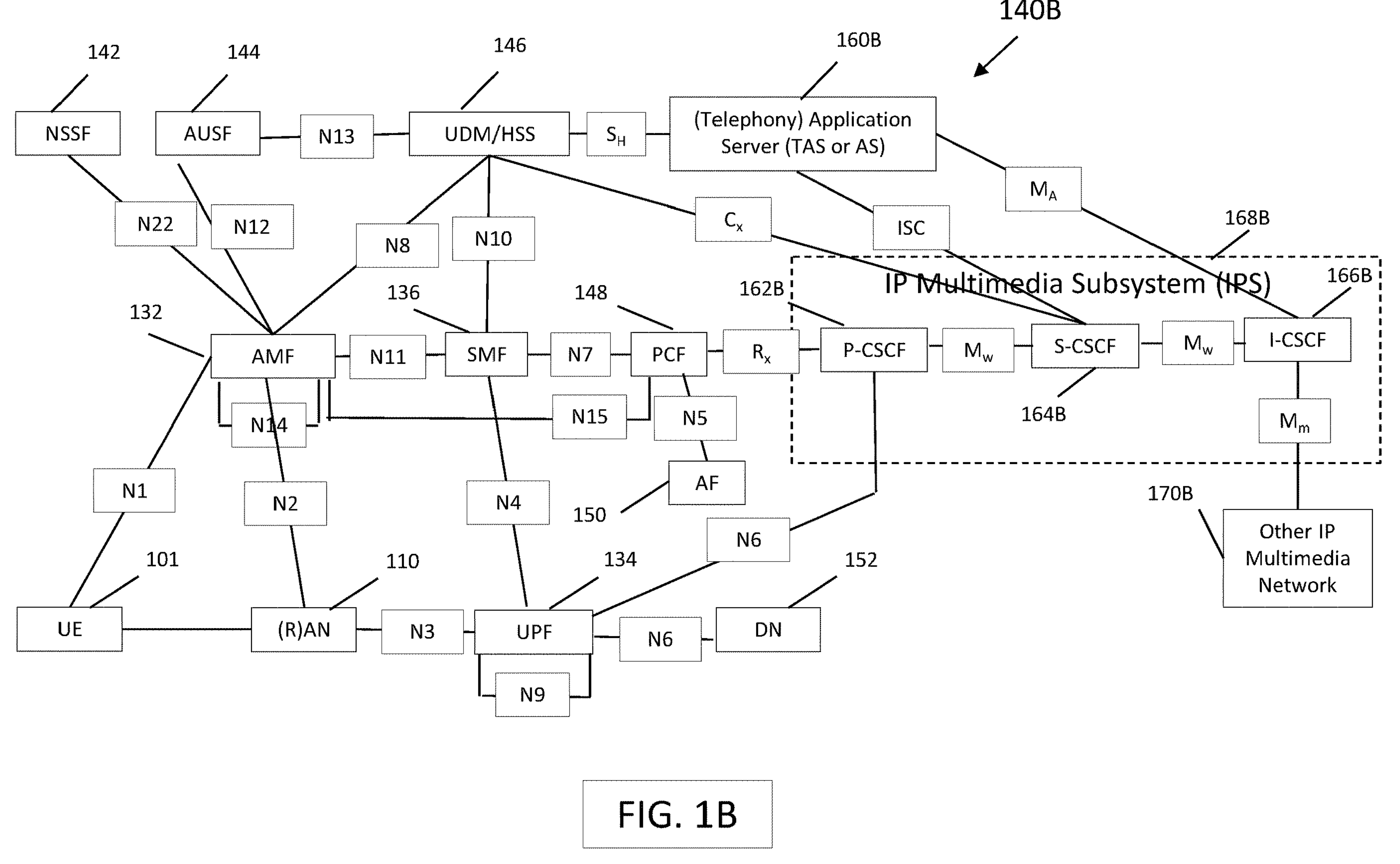
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
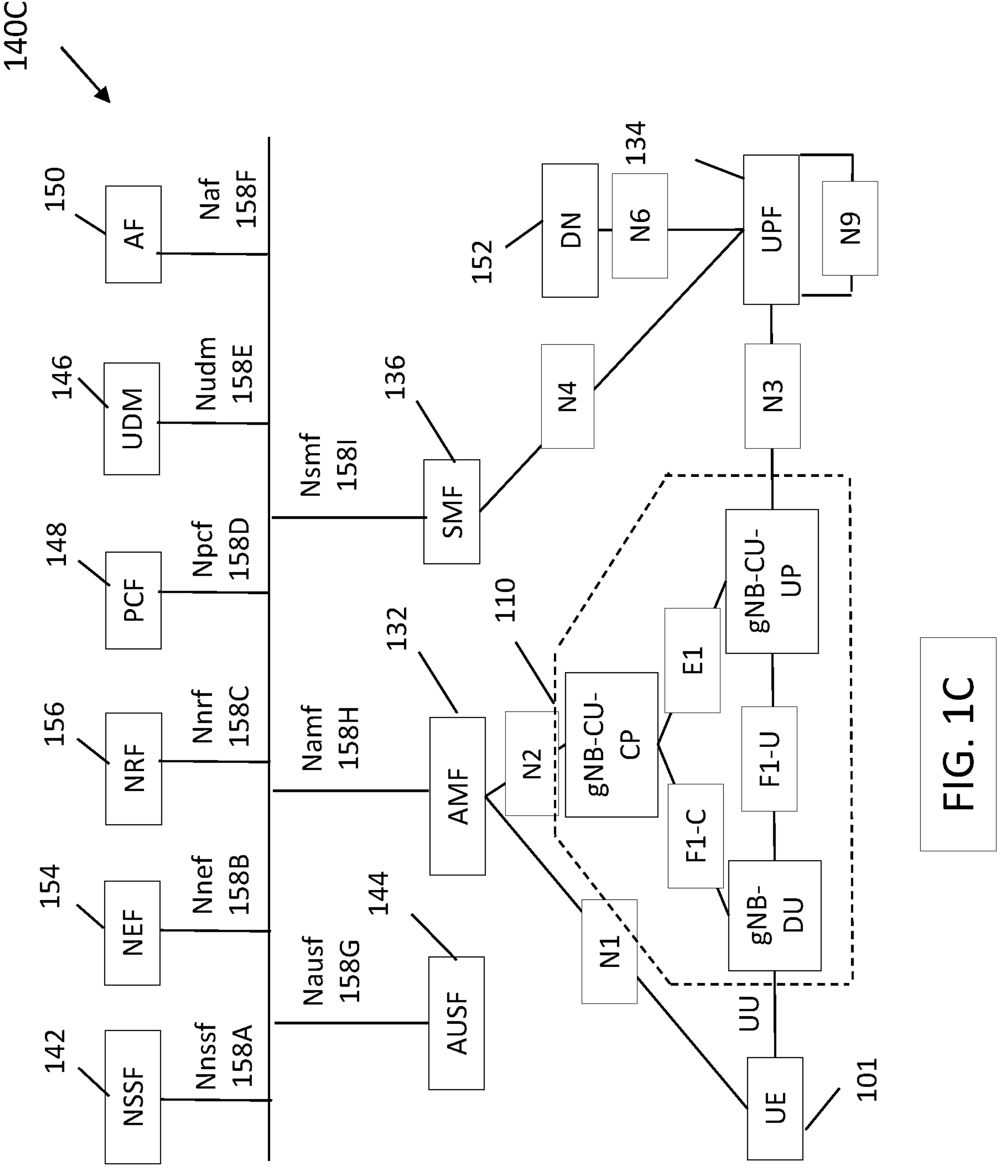
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
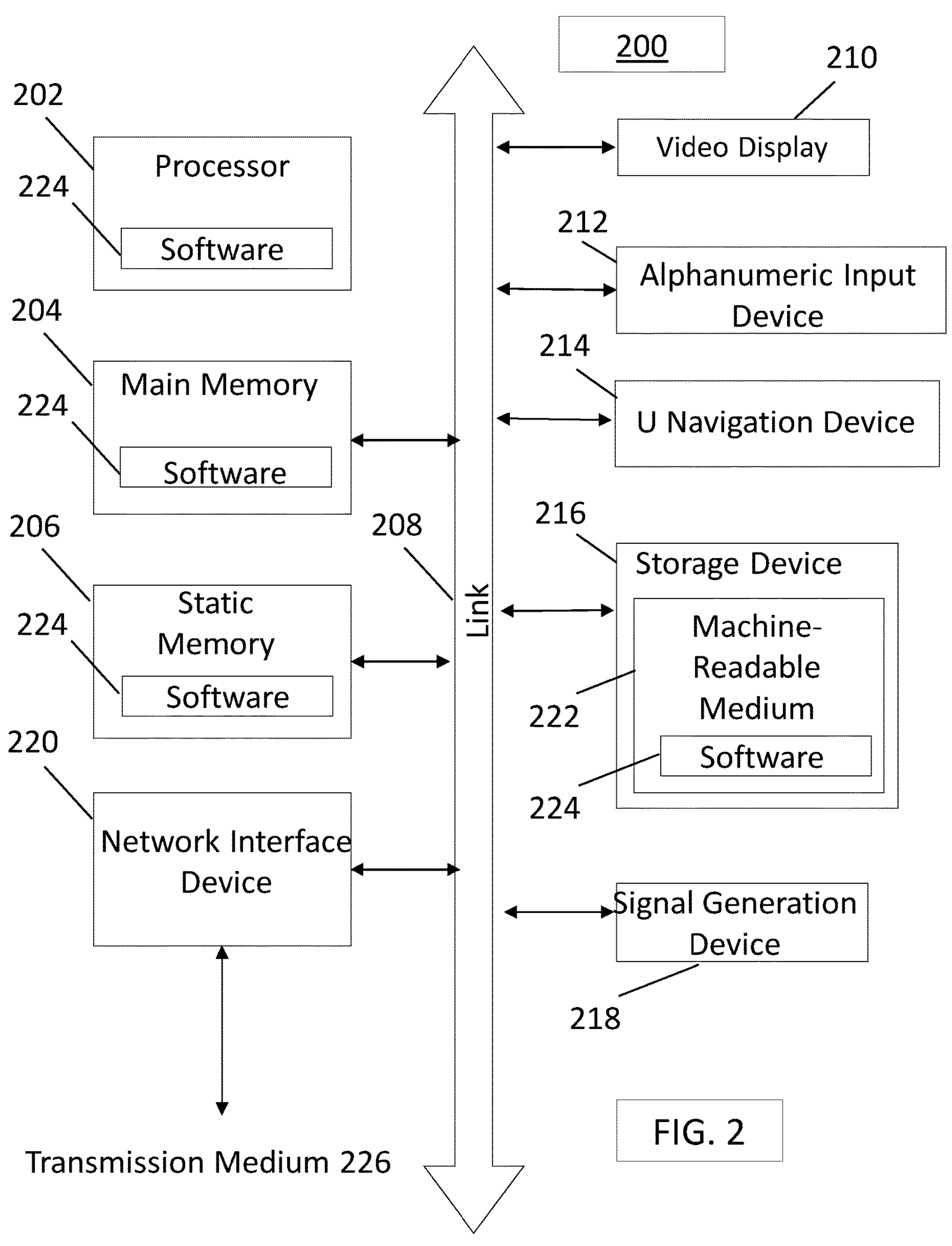
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/

CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, NR V2X sidelink communication is a synchronous communication system with distributed resource allocation. UEs autonomously select resources for sidelink transmission based on predefined sensing and resource selection procedures implemented by transmitter (TX) UEs. The sensing and resource selection procedures are designed to reduce potential sidelink conflicts in transmissions or resource reservations (e.g., collisions or half-duplex conflicts). Given that sensing and resource selection procedures are executed only by TX UEs and do not consider environment at the receiver (RX) side there is non-negligible probability of sidelink conflicts (collisions). To address this problem, inter-UE coordination feedback from RX UEs can be used to improve resource allocation decisions by TX UEs and improve overall reliability of NR-V2X sidelink communication.

In some embodiments, two types of transmissions may be used for delivering inter-UE coordination feedback to TX UEs. This may be used to minimize co-channel and half-duplex issues for feedback delivery and keep small overhead from feedback transmission without noticeable impact on overall system loading.

Two high level inter-UE coordination solutions may be used to improve NR V2X sidelink performance: Inter-UE coordination scheme #1 (sidelink conflict/collision avoidance) and Inter-UE coordination scheme #2 (sidelink conflict resolution).

Reference Parameters for Generation of Inter-UE Coordination Feedback

Inter-UE coordination scheme #1 (sidelink conflict/collision avoidance) aims to utilize inter-UE coordination feedback to avoid half-duplex and collisions problems for NR V2X communication. In this case, a UE providing inter-UE coordination feedback reports preferred and/or non-preferred sets of resources to surrounding sidelink transmitters. Sidelink transmitters then apply TX-based sensing procedures and use received inter-UE coordination feedback to select/reserve sidelink resources for transmission and avoid potential sidelink communication conflicts.

Inter-UE coordination scheme #2 (sidelink conflict resolution) aims to utilize inter-UE coordination feedback to resolve sidelink conflicts that either already occurred or potential future conflicts that were detected based on resource reservation signaling. This is used to inform sidelink transmitters about detected sidelink conflicts through inter-UE coordination feedback, so that TX UEs can either perform additional retransmission, or drop planned transmission and reselect a resource for transmission or continue transmission on a reserved resource.

Support of inter-UE coordination scheme #1 may include a number of aspects, including: UE procedures/methods for generation of inter-UE coordination feedback, UE procedures/methods to determine inter-UE coordination feedback cast type and target UEs, UE procedures/methods for transmission of inter-UE coordination feedback and its content, inter-UE coordination feedback reference time and aging information, reference parameters for generation of inter-UE coordination feedback, UE procedures/methods for resource selection with inter-UE coordination feedback, and inter-UE coordination signaling details.

In particular, embodiments of the reference parameters for generation of inter-UE coordination feedback are described. For inter-UE coordination Scheme 1, which utilizes signaling of preferred or non-preferred resource sets from assisting UE-A(s) to target UE-B(s), it is assumed that a resource identification procedure is executed at the physical layer to determine the resource sets. Currently, this procedure utilizes multiple parameters which are either: (1) configured to a specific value (e.g., remaining resource ratio X %), (2) configured to a set/range of values and it is up to UE to decide a particular value (e.g., resource selection window size), (3) internal to the UE and decided based on higher layer and/or implementation (e.g., reservation period, priorities).

This makes the procedure of resource identification highly dependent on multiple parameters. If these parameters are unknown to the UE-B that tries to utilize the inter-UE coordination feedback, it may introduce undesirable effects to the system and UE performance. The concept of reference configuration for inter-UE coordination feedback generation is discussed below, in which the reference configuration is applied for determination of preferred/non-preferred resource sets, and is known to UE-B when the sets are applied in resource selection procedures.

Reference Configuration for Inter-UE Coordination Feedback Generation

The following list of reference configuration settings can be provided to assisting UEs and TX UEs by network (pre-)configuration or by assisting UEs to TX UE(s) jointly with the results of inter-UE coordination feedback, or by TX UE(s) to assisting UEs during connection setup or inter-UE coordination request:

Reference number of sub-channels L per sidelink preferred/non-preferred resource. By default, a single subchannel can be used. The reference number can also be indicated whether the resources of size L>1 sub-channel are allocated in an orthogonal manner or non-orthogonal manner. Here, an orthogonal manner assumes that for the first candidate resource in the slot sub-channels indexed 0 . . . L−1 are allocated, for the second candidate resource in the slot sub-channels indexed L . . . 2*L−1 are allocated, etc., and a non-orthogonal manner assumes that for the first candidate resource in the slot sub-channels indexed 0 . . . L−1 are allocated, for the second candidate resource in the slot sub-channels indexed 1 . . . L are allocated, etc. with a shift of 1 sub-channel.

The sub-channel size may be (pre-)configured, or may be fixed to 1 PRB, or may be reused from the associated resource pool configuration.

Reference resource pool configuration, where resource identification is performed.

Reference TX priority value from 1 to 8. By default, the lowest or the highest priority value can be used.

Reference resource selection window parameters or bounds for resource selection window determination. The parameters may include start/end time or start+duration in sidelink subframes/slots/symbols. By default, the minimum possible start time and the maximum possible end time may be assumed by the UE, where the minimum may be the next slot after the resource identification trigger and the maximum may be the maximum resource reservation period configured for a resource pool.

Reference sensing window parameters. The parameters may include start/end time or start+duration in sidelink subframes/slots/symbols. By default, the sensing window may be 1100 ms or slots as the maximum value supported currently in NR V2X system. Alternatively, the sensing window parameters are not configured/provided separately for inter-UE coordination feedback since such parameters are to be known to the UE before active operation. Furthermore, having separate sensing windows sizes for inter-UE coordination and for regular resource selection may complicate UE implementation.

Reference size of resource set in % (e.g., minimum size of resource set(s)—5, 10, 20, 30, 40, 50% of resources in selection window). The default value could be fixed in specification e.g., to 20% or other value. The execution of this operation may additionally be included or excluded by configuration which has an impact on the actual % of resources.

Reference threshold types and values (e.g., $\text{SL-RSRP}_{preferred}$ $\text{SL-RSRP}_{non\text{-}preferred}$) used to construct preferred and non-preferred resource sets by processing sidelink measurements.

Required minimum sensing window.

Configuration for partial sensing requirements to generate inter-UE coordination.

Reference number of potential future collisions considered in the feedback generation. This can be a fixed value, per periodicity, or every occasion below a threshold after the end of the window. C_resel used for resource identification may be assumed either to 1 or to 10, or 10 seconds, etc.

Functionality Related to Reference Configurations

A set of the above parameters may be associated with a reference configuration, and multiple such configurations may be provided to a UE either by the network (pre-) configuration signaling or by PC5 RRC signaling established between the UEs.

An assisting UE can be configured by another TX UE with reference configuration(s) for generation of inter-UE coordination feedback and construction of preferred and non-preferred resource sets.

The assisting UE can be (pre-)configured with multiple reference configurations for generation of inter-UE coordination feedback and requested to provide feedback for subset of configurations.

The assisting UE can generate multiple inter-UE coordination reports for multiple reference configurations.

The assisting UE can be requested to generate inter-UE coordination report for specific configuration ID associated with a subset of the reference configurations.

The assisting UE can generate an inter-UE coordination feedback and signal a reference configuration ID associated with the report.

In some cases, the reference configuration for a preferred/non-preferred resource set configuration may differ by at least one parameter from the configuration used by a TX UE (UE-B) for resource selection for its transmission. This leads to a problem of preferred/non-preferred resource set and parameters conversion from the reference configuration to the desired configuration.

In one example, a UE may not be expected to take into account the preferred/non-preferred resources if translation from the reference configuration to current configured of the TX UE is not possible.

In one example, it may be left up to UE implementation how to perform translation of a first preferred/non-preferred resource set composed in the assumption of the first reference configuration to a second preferred/non-preferred resource set for the assumption of the second reference configuration.

Figure 3B:
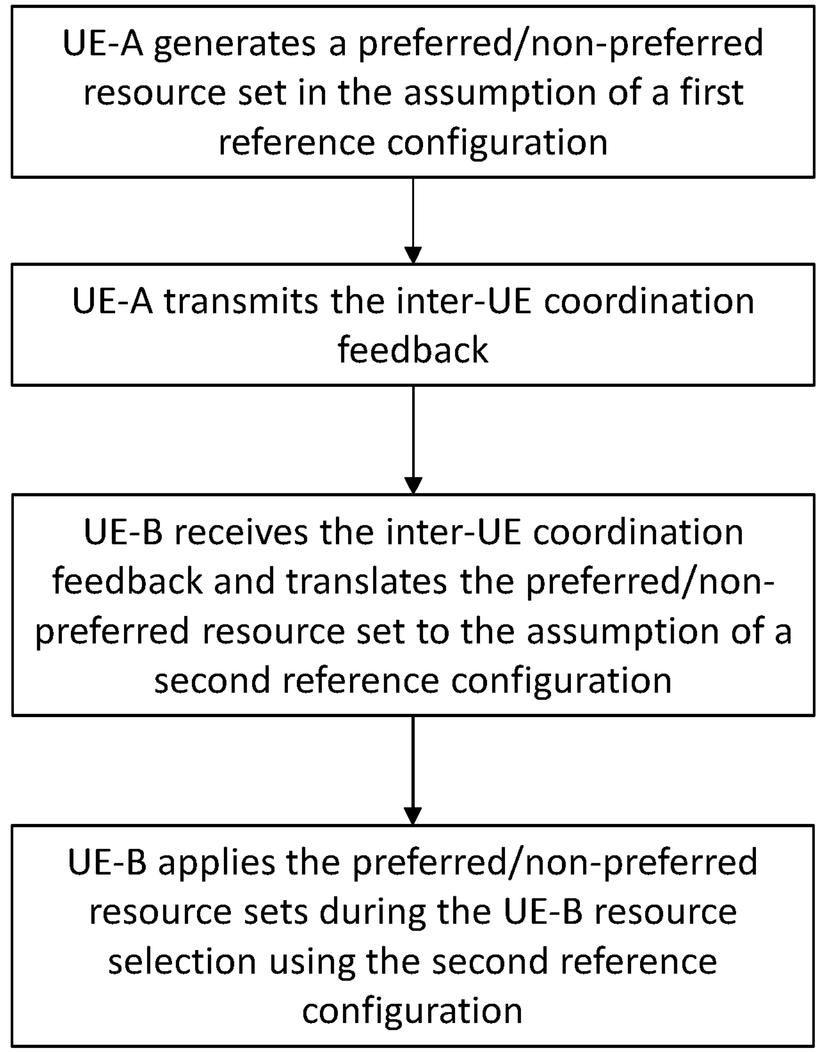
FIG. 3B illustrates another translation of the preferred/non-preferred resources from a first reference configuration to a second reference configuration at the UE-B side in accordance with some embodiments.

In one example, the translation from one reference configuration to another reference configuration may be performed at the assisting UE-A before reporting the inter-UE coordination feedback. FIG. 3A illustrates translation of the preferred/non-preferred resources from a first reference configuration to a second reference configuration at the UE-A side in accordance with some embodiments. Alternatively, the translation from one reference configuration to another reference configuration may be performed at the target TX UE (UE-B) after the reception of the inter-UE coordination feedback. FIG. 3B illustrates another translation of the preferred/non-preferred resources from a first reference configuration to a second reference configuration at the UE-B side in accordance with some embodiments.

Figure 4:
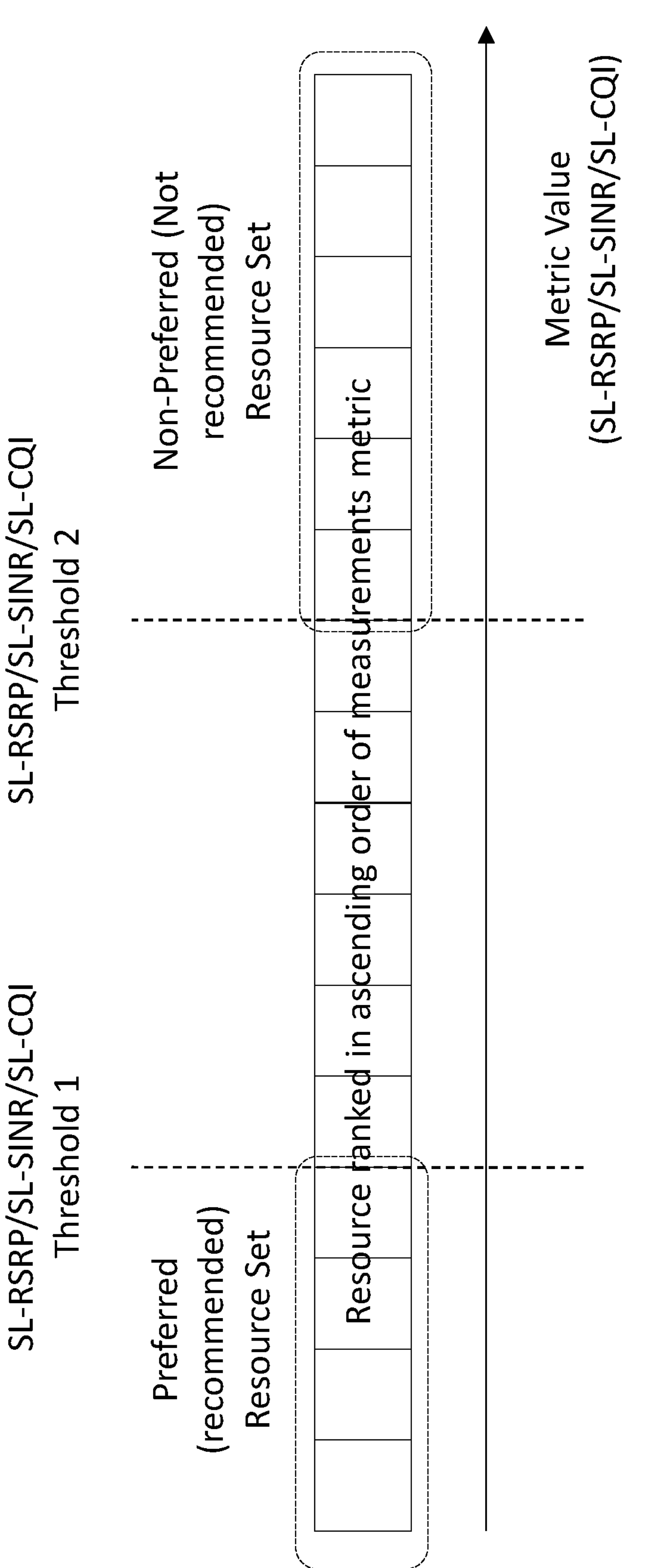
FIG. 4 illustrates two sidelink Reference Signal Received Power (SL-RSRP) thresholds for preferred and non-preferred resource sets in accordance with some embodiments.

SL-RSRP/SL-CQI/SL-Signal-to-Interference-Plus-Noise Ratio (SL-SINR)/Range Thresholds for Generation of Inter-UE Coordination Feedback Separate values of SL-RSRP thresholds can be configured for the sensing procedure to generate preferred and/or non-preferred resource sets for the purpose of inter-UE coordination feedback. These thresholds can be used on top of SL-RSRP thresholds used for general TX based sensing procedure (that are incremented to ensure the min size of the resource set). A $1^{st}$ SL-RSRP threshold can be used to determine resources with SL-RSRP measurements below the threshold and thus can be used for determination of the preferred resource set. A $2^{nd}$ SL-RSRP threshold can be used to determine resources with SL-RSRP measurements above the threshold and thus can be used for determination of the non-preferred resource set. FIG. 4 illustrates two sidelink SL-RSRP thresholds for preferred and non-preferred resource sets in accordance with some embodiments.

The SL-RSRP thresholds may be also defined per priority or priority pair value and may increment or decrement to satisfy condition on the pre-configured size of the preferred and non-preferred resource sets. In this case the final thresholds settings can be reported together with the associated resource sets. Alternatively, thresholds can be fixed to the pre-configured values and thus the procedure of incrementing/decrementing thresholds can be omitted.

In one example, multiple SL-RSRP thresholds may be provided and therefore multiple sets of preferred/non-preferred resources may be generated and reported.

In addition to the SL-RSRP threshold, also the demodulation reference signal (DMRS) type (physical sidelink control channel (PSCCH) or physical sidelink shared channel (PSSCH)) used for the SL-RSRP calculation can be defined separately.

Without loss of generality, the SL-RSRP threshold and SL-RSRP measurements may be substituted by any of SL channel quality indicator (CQI), SL SINR, communication range, etc.

Minimum/Maximum Size of the Resource Set for Inter-UE Coordination Feedback

The minimum relative size of the preferred and/or non-preferred resource sets can be controlled by pre-configuration. In this case, an iterative procedure may be reused to ensure the minimum relative size of the resource set by adapting the SL-RSRP thresholds (e.g., incrementing/decrementing) for the inter-UE coordination feedback. If this legacy procedure is reused by a UE providing inter-UE coordination feedback, then the UE may also share information on the latest valid value of the SL-RSRP threshold(s) applied to generate resource set(s) for feedback. This procedure can be simplified if the minimum relative size of resource sets is not pre-configured and SL-RSRP thresholds are not adapted/changed.

The fixed SL-RSRP threshold values can be pre-configured to determine the resource set(s) and its size for feedback. In this case, the size of resource set may vary in the range from 0 (empty set) to maximum size (all resources). The maximum size of resource set—M for reporting may be pre-configured. If the resource set size is larger than M, then the M first resources ranked in ascending/descending order of RSRP values can be reported for preferred/non-preferred resource sets.

Alternatively, the assisting UE may indicate the actual size of the resource set and report all resources satisfying SL-RSRP conditions. The assisting UE may give secondary information on medium utilization for considered SL-RSRP values.

UE Procedure for Generation Inter-UE Coordination Feedback (Preferred/Non-Preferred Resource Sets)

As above, inter-UE coordination scheme #1 provides information about sidelink resource set(s) from assisting UE(s) to TX-UE(s). The assisting UE(s) can provide inter-UE coordination feedback including either preferred or non-preferred or both types of sidelink resource sets to TX UE(s) selecting/reserving sidelink resources for potential transmissions. TX UEs are expected to perform a TX-based sensing and resource selection procedure considering information from the inter-UE coordination feedback. Definitions for preferred and non-preferred resource sets are provided below as a part of inter-UE coordination feedback.

Preferred Resource Set

Two types of preferred resource sets can be defined. The first preferred resource set can be constructed based on a sensing procedure (sideling control information (SCI) decoding and sidelink measurements) to identify resources that are not reserved by other UEs for sidelink transmission. The second preferred resource set can provide information on sidelink resources (i.e., slots) preferred by the UE for its own sidelink reception.

Preferred resource set (Type-1)—is the subset of sidelink resources within a sidelink resource pool that is associated with a certain time interval (e.g., a resource selection window for inter-UE coordination feedback) and that is indicated as a recommended set of resources from the assisting UE's perspective, providing inter-UE coordination feedback to assist TX UE(s) in resource selection decisions for potential sidelink transmissions. Single sidelink resource can be represented by N consecutive subchannels within a sidelink slot (e.g., N=1).

The preferred set of sidelink resources can be identified using the sidelink sensing procedure (i.e., using a sensing-based preferred resource set) as specified in 3GPP TS 38.214, section 8.1.4. The preferred resource set is composed of sidelink resources with SL-RSRP measurements below a SL-RSRP threshold (or within SL-RSRP range) that can be pre-defined/pre-configured and determined by the assisting UE. The sidelink sensing procedure could include either full sensing for a (pre-)defined/(pre-)configured window or partial sensing with sensing information collected from periodic and contiguous windows before a resource re-selection trigger. The preferred resources can be identified based on the same resource selection principles as used for resource (re)-selection and may consider all restrictions of the respective sensing type.

The preferred resource set can also include non-reserved resources for which SL-RSRP measurements are not available and thus may be interpreted as non-occupied resources.

The preferred resources can be pool-specific, i.e., signaled in the assumption of a particular resource pool logical resources, or may be pool-agnostic, with time and frequency resources indexed in a physical resources manner without considering resource pool configurations.

Preferred time resource set (Type-2)—The preferred time resource set represent sidelink time resources (e.g., slots, subframes) associated with a certain time interval and that is indicated as a recommended set of time resources from the assisting UE's perspective.

The preferred time resource set can be identified based on UE information of it's own dynamic or semi-persistent transmissions, active/idle states time intervals, using a sidelink sensing procedure as specified in 3GPP TS 38.214, section 8.1.4.

The Type-1 and Type-2 preferred resource sets can be signaled as a single common set of sidelink resources or independently.

Non-Preferred Resource Set

Two types of non-preferred resource sets can be defined. The first non-preferred resource set can be constructed based on a sensing procedure (SCI decoding and sidelink measurements) to identify resources that are reserved by other UEs for sidelink transmission. The second non-preferred resource set can provide information on sidelink resources (i.e., slots) selected/reserved by the UE for its own sidelink transmission or assigned for uplink transmission.

Non-preferred resource set (Type-1)—is the subset of sidelink resources within a sidelink resource pool that is associated with a certain time interval (e.g., resource selection window for inter-UE coordination feedback) and that is indicated as a NOT recommended set of resources from the assisting UE's perspective, providing inter-UE coordination feedback to assist TX UE(s) in resource selection decisions for potential sidelink transmissions. A single sidelink resource can be represented by N consecutive subchannels within sidelink slot (e.g., N=1).

The non-preferred set of sidelink resources (Type-1) can be identified using the sidelink sensing procedure (i.e., a sensing-based non-preferred resource set). The non-preferred resource set is composed of resources with estimated SL-RSRP measurements above a certain SL-RSRP threshold or SL-RSRP range that can be pre-defined/pre-configured and determined by the assisting UE. The sidelink sensing procedure could consist of either full sensing for a (pre-)defined/(pre-)-configured window or partial sensing with sensing information collected from periodic and contiguous windows before a resource re-selection trigger. The non-preferred resources are identified based on the same resource selection principles as used for resource (re)-selection and consider all restrictions of the respective sensing type.

Non-preferred time resource set (Type-2)—is the subset of sidelink time resources within a sidelink pool that is associated with a certain time interval (e.g., a resource selection window for inter-UE coordination feedback) and that is indicated as NOT a recommended set of time resources from the assisting UE perspective.

The non-preferred time resource set (Type-2) can be identified using information on already scheduled transmissions, active/idle time intervals, using a sidelink sensing procedure as specified in 3GPP TS 38.214, section 8.1.4. For the case of semi-persistent transmissions, the non-preferred time resource set can include time resources selected for the single upcoming packet transmission only or selected for all packets expected to be transmitted within resource reservation interval.

The Type-1 and Type-2 non-preferred resource sets can be signaled as a single common set of sidelink resources or independently.

Thresholds for Construction of Resource Sets

SL-RSRP threshold(s) for both preferred and non-preferred resource sets can be defined per sidelink transmission priority $p_{TX}$ or priority pair ($p_{TX}$, $p_{FB}$), here $p_{TX}$—sidelink transmission priority of the TX UE, $p_{FB}$-reference value of sidelink transmission priority used by UE providing inter-UE coordination feedback for construction of preferred or non-preferred resource set. Separate SL-RSRP thresholds or SL-SRSP ranges can be (pre)-configured to determine preferred and non-preferred resources sets by UE providing inter-UE coordination feedback.

SL-RSRP thresholds for identification of preferred resource sets can be pre-configured to the assisting UE providing inter-UE coordination feedback by the network, another UE or gNB, or the application layer.

Two types of UE behavior in terms of SL-RSRP thresholds can be foreseen:

Fixed threshold(s). In this case, a pre-configured threshold value is not supposed to be changed and is used for identification of preferred and non-preferred resources and resource set(s). Different threshold values can be pre-configured to generate different resource sets.

Adaptive threshold(s). In this case the threshold can be incremented or decremented to enable the number of resources in the set to be higher, equal to, or less that a value X % of the total considered resources. The value of X can be (pre)-configured depending on other system parameters like the priority or the state of the congestion control. The value of X can also be dynamically negotiated before the feedback for unicast or groupcast connections. It is also possible that this value is dynamically configured by the network, or other UEs or gNBs, or the application layer. In this case, the UE providing inter-UE coordination feedback can also report the final value of SL-RSRP thresholds associated with the reported sets of resources.

Instead, or together with SL-RSRP thresholds, other metrics can be pre-configured and applied to form sidelink resource sets for inter-UE coordination feedback (e.g., SL-SINR/SL-CQI or SL communication range) in certain scenarios. As shown in FIG. 4, SL-RSRP thresholds and/or SL-SINR thresholds may be used to form a preferred and non-preferred resource set for inter-UE coordination feedback.

The UE can be pre-configured with multiple values of thresholds (or value ranges) and report information on preferred and non-preferred resources sets for each threshold value in differential manner (i.e., starting from one resource set and providing additional resources available for the next threshold value).

The non-preferred resources can be pool-specific, i.e., signaled in the assumption of a particular resource pool logical indexes, or may be pool-agnostic, with time and frequency resources indexed in physical resources manner without considering resource pool configurations.

On SL-SINR/SL-CQI Thresholds for Inter-UE Coordination Feedback

For instance, in case of unicast inter-UE coordination feedback (if feedback is provided by the target receiver to the target transmitter), the SL-SINR or SL-CQI thresholds can be applied to determine the set of preferred/non-preferred resource set(s) instead of the SL-RSRP threshold(s).

These thresholds can be also defined per sidelink transmission priority or priority pair ($p_{TX}$, $p_{FB}$) and pre-configured or adaptively adjusted (incremented/decremented) by the UEs. To derive SL-SINR, the SL-CQI, assisting UE may use SL-RSRP measurements from the target TX UE and SL-RSRP measurements from other UEs to estimate SL-SINR or SL-CQI on sidelink resources based on indicated allocations. The threshold of these parameters can also depend on other system states like the congestion control. The calculation of the SL-SINR and SL-CQI can be based on the PSCCH or PSSCH DMRS or any other reference signal present in the system.

To further optimize performance, multiple resource sets can be indicated in the inter-UE coordination feedback (for either preferred/non-preferred resources) corresponding to different measurement metrics:

- Set 1: constructed using SL-RSRP thresholds—mainly provides information about the radio-range and only implicitly considers interference.
- Set 2: constructed using SL-SINR thresholds—provides more precise additional information about radio-conditions and can be used for unicast/groupcast communication to improve resource selection.
- Set 3: constructed using SL-CQI thresholds—provides more precise additional information about resource quality that can be used for unicast/groupcast communication to improve resource selection.
- Set 4: constructed using SL communication range thresholds—has similar meaning as SL-RSRP, but may be used as additional information.

For further optimization, SL-RSRP/SINR/CQI/range values can be also reported per each sidelink resource or group of resources that are part of the reported resource set(s).

Procedure for Generation of Preferred/Non-Preferred Resource Sets

A sensing procedure can be used to generate inter-UE coordination feedback for sidelink conflict avoidance. Assisting UEs may provide feedback on preferred and non-preferred resource sets to the TX UE selecting resources to augment results of TX-based sensing for resource selection.

The sensing procedure to form preferred or non-preferred resource set may depend on whether semi-persistent transmissions are enabled or disabled in the considered sidelink resource pool:

Option 1. Semi-persistent transmissions are disabled in a resource pool (i.e., only dynamic sidelink transmissions are supported)

Option 1A: Sensing based inter-UE coordination feedback (comprising preferred/non-preferred resource set(s)) for sidelink conflict avoidance is enabled and generated for dynamic transmissions/reservations. In this case, the use of inter-UE coordination feedback (resource set(s)) may suffer from feedback delay due to the fast outdating of information dynamic allocations in time (the maximum aging time should be less than SCI signaling window duration which is equal to 32 logical slots in NR V2X Rel-16).

Option 1B: Sensing based inter-UE coordination feedback for sidelink conflict avoidance is disabled or not supported for this resource pool. Considering the practical inter-UE coordination feedback delays this may be desirable in terms of UE implementation complexity.

Option 2. Semi-persistent transmissions are enabled in a resource pool (i.e., sidelink resources are used either for dynamic or semi-persistent sidelink transmissions). Sensing based inter-UE coordination for sidelink conflict avoidance is enabled.

Figure 5A:
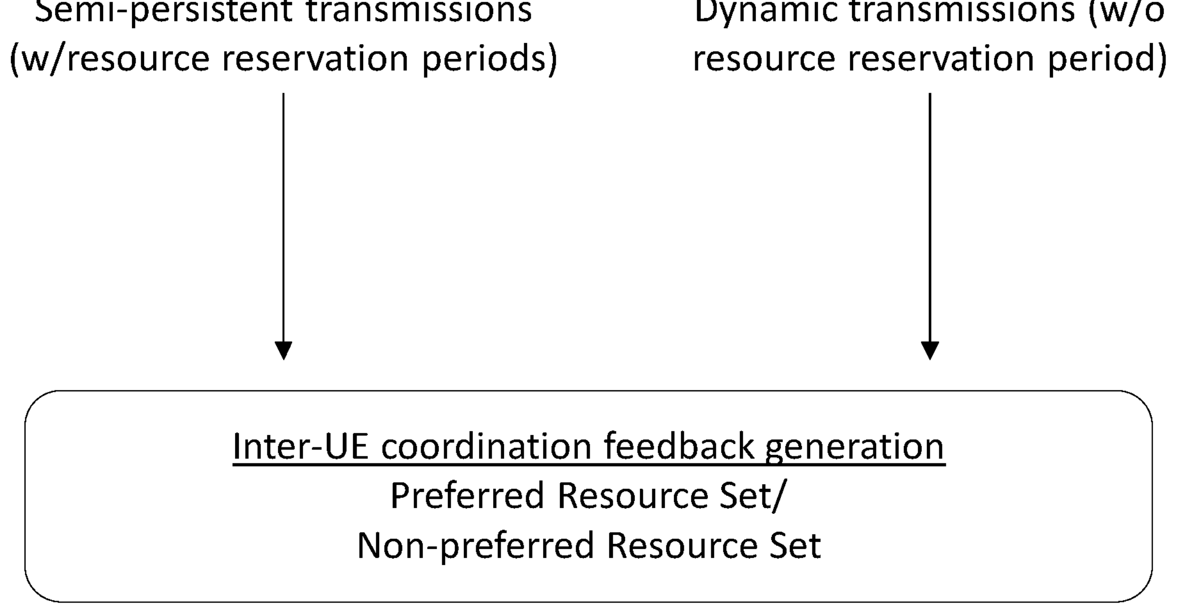
FIG. 5A illustrates inter-UE coordination feedback generation in accordance with some embodiments.

Option 2A: Inter-UE coordination feedback is enabled for both dynamic and semi-persistent sidelink transmissions. FIG. 5A illustrates inter-UE coordination feedback generation in accordance with some embodiments.

Alt.-1: Semi-persistent transmissions are treated in the same way as dynamic for generation of inter-UE coordination feedback (resource set) for sidelink conflict avoidance (i.e., the assisting UE assumes reservation period indicated in the SCI is equal to zero $P_{RSV}=0$, instead of actual value indicated in SCI). In this case, the use of inter-UE coordination feedback for semi-persistent transmission may be sub-optimal but may benefit from additional reliability. Specific behavior considering transmission/reservation period(s) to be applied by the assisting UE may be avoided.

Alt.-2: Semi-persistent and dynamic transmissions are treated as semi-persistent and dynamic transmissions accordingly (processed separately). In this case, for generation of inter-UE coordination feedback (resource sets) for sidelink conflict avoidance, the subset of resources corresponding to dynamic and semi-persistent transmissions can be prepared and reported separately (i.e., the reported set can be composed from a subset associated with periodic transmissions and a subset associated with dynamic transmissions). In another embodiment, resources associated with dynamic reservations can be also excluded from feedback or combined with semi-persistent resources.

In Alt.2, the inter-UE coordination feedback is optimized for both semi-persistent and dynamic transmissions. Support of Alt.2 may use additional knowledge of the semi-persistent transmission/reservation period applied by the assisting UE to form the resource set (e.g., the sub-set of resources associated with semi-persistent transmissions):

Alt.-2A: Semi-persistent transmission period for resource reservation is provided to the assisting UE. The assisting UE can analyze potential conflicts for future transmission periods when the assisting UE generates resources sets for inter-UE coordination feedback. The number of considered potential future conflicts can be determined based on a function providing the duration of the time interval and the relation of the received signal periodicity and intended transmission/reservation period in the same fashion as for resource (re)-reselection. or a pre-defined/pre-configured number of potential future transmissions can be considered. It is also possible to consider all potential future transmissions within a certain time interval. The semi-persistent transmission period(s) for resource reservation applied for generation of inter-UE coordination feedback can be either:

(Pre)-configured to the assisting UE(s) providing inter-UE coordination feedback (e.g., by UE/gNB/network or application layer through higher layer signaling).

Provided/configured by the target TX UE to assisting UE(s) for generation of inter-UE coordination feedback. On top of a resource reservation period indication/configuration, the TX UE can also include the time instance/interval when inter-UE coordination feedback is expected from the assisting UE (e.g., the time instance/interval immediately before the next resource reselection), so that the assisting UE can provide feedback for the indicated time interval (resource selection window parameters). Such behavior can be considered for unicast and groupcast communication in case of semi-persistent transmissions since the TX-UE is able to determine when such a communication is expected to reselect resources for a given semi-persistent process and thus can request inter-UE coordination feedback for a specific-time interval (e.g., resource selection window) in future.

Provided by higher layers or autonomously determined by assisting UE(s) providing inter-UE coordination feedback e.g., from the allowed set of semi-persistent transmission periods. For instance, the smallest period can be used, or another allowed value corresponding to the most dominant/popular value of transmission periods.

In a general case, the assisting UE may have information on multiple semi-persistent reservation periods and thus generate feedback for each value of potential reservation period (or subset of reservation period values) in the allowed transmission periods pre-configured for sidelink transmission periods. In other words, the UE can generate preferred/non-preferred resource set(s) per each reservation period and report multiple sets or one set that was generated considering the subset of, or all allowed values of, the resource reservation periods.

Figure 6A:
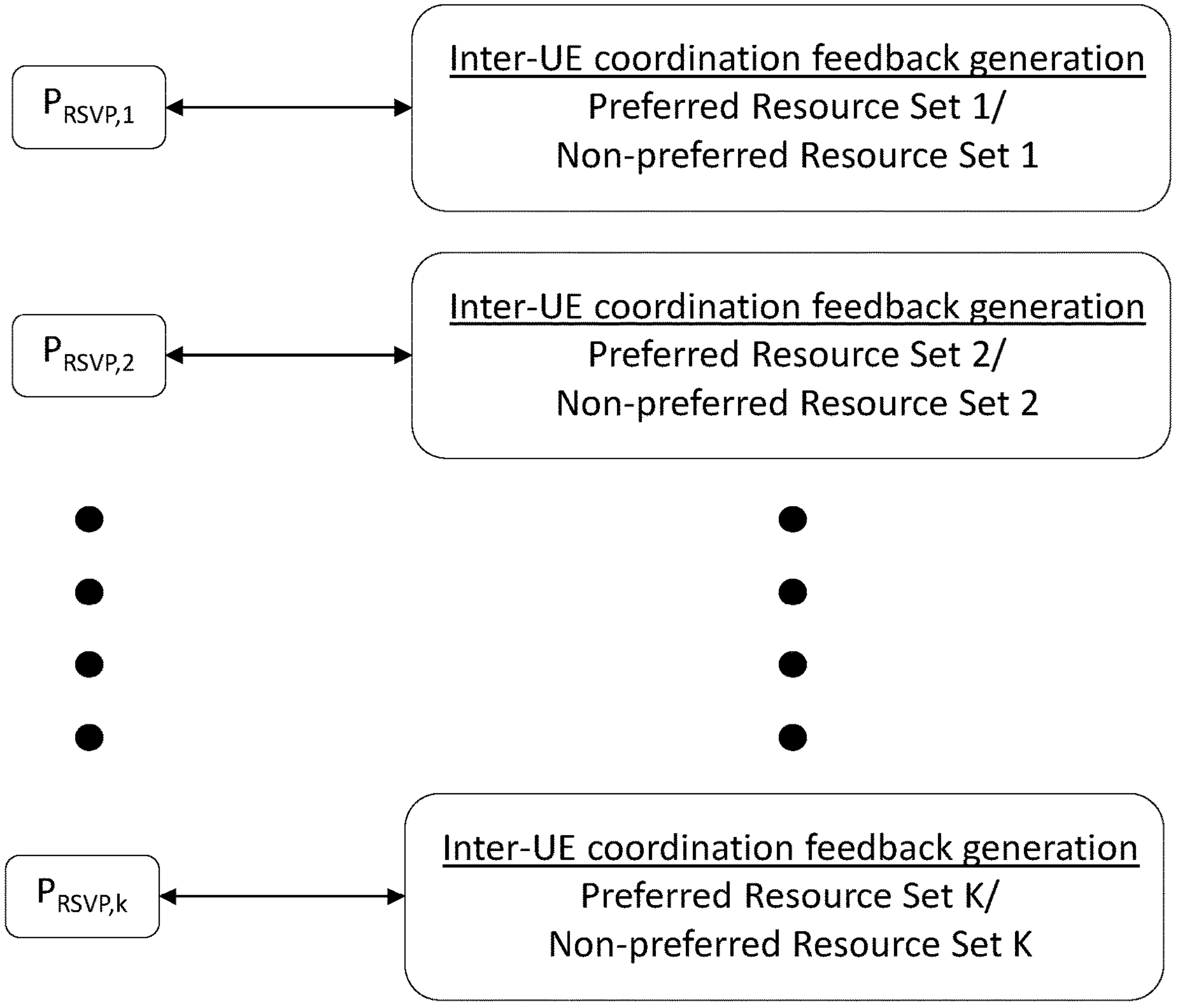
FIG. 6A illustrates resource set vs. reservation generation by an assisting UE in accordance with some embodiments.
Figure 6B:
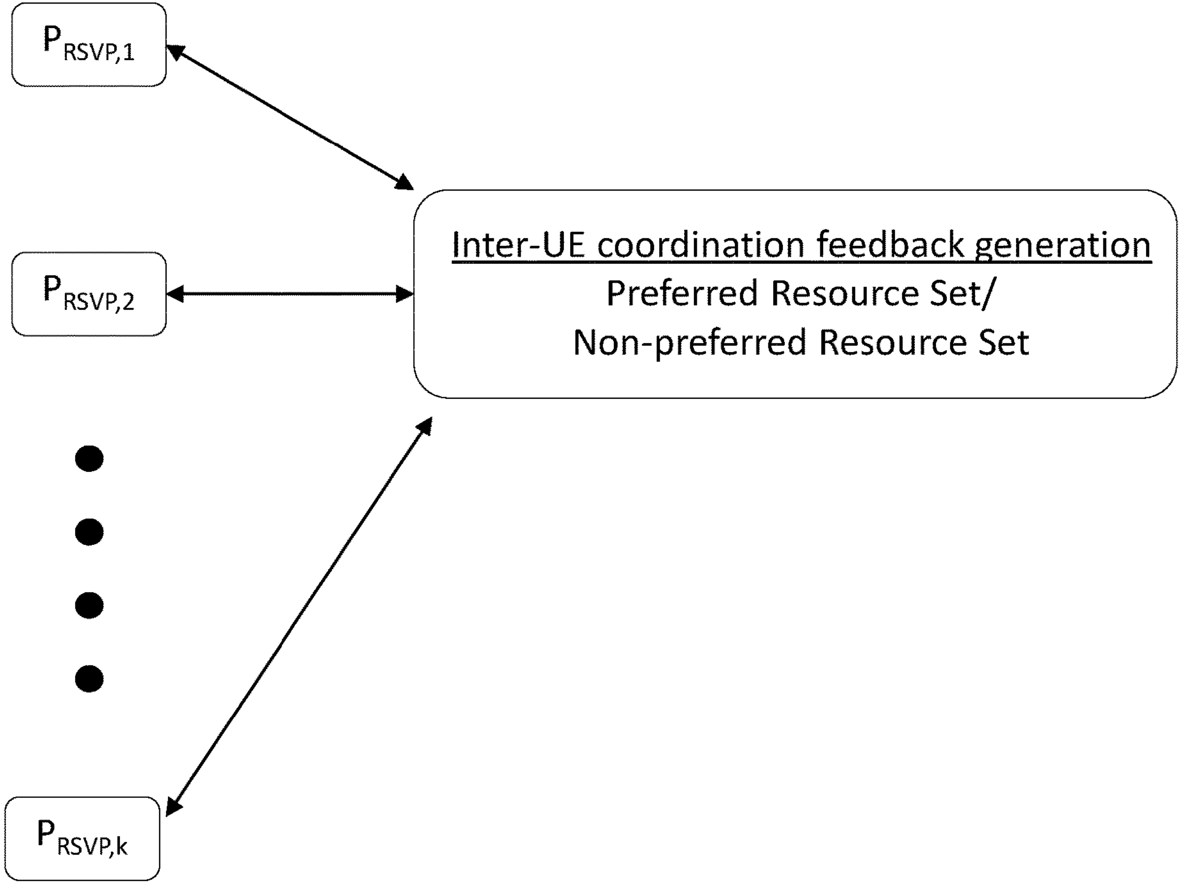
FIG. 6B illustrates another resource set vs. reservation generation by an assisting UE in accordance with some embodiments.

The above embodiments are shown in FIGS. 6A and 6B, in which FIG. 6A illustrates resource set vs. reservation generation by an assisting UE in accordance with some embodiments, and FIG. 6B illustrates another resource set vs. reservation generation by an assisting UE in accordance with some embodiments.

Figure 7A:
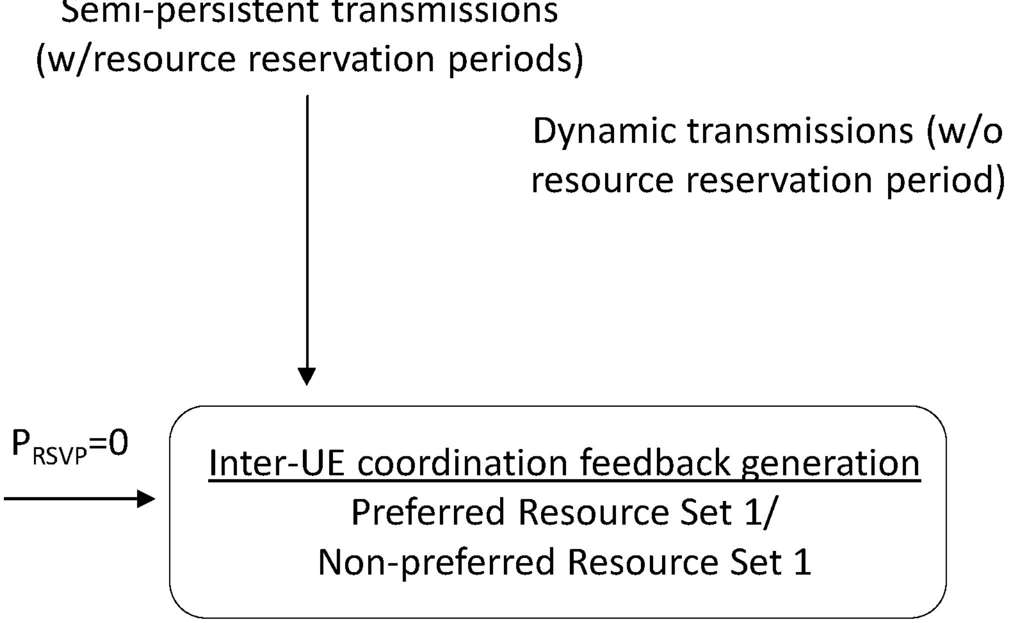
FIG. 7A illustrates resource set generation for different reservation periods by an assisting UE in accordance with some embodiments.

Alt.-2B: Semi-persistent transmission period for resource reservation is not known to assisting UE. In this case, assisting UE may either:

Case 1. Use $P_{RSVP}$=0 like for dynamic transmissions and skip analysis of potential conflicts for future transmission periods (i.e., consider only one-shot transmission/reservation for inter-UE coordination feedback). In this case, the assisting UE may still prepare two subsets of resources for inter-UE coordination feedback: one based on dynamic transmissions and one based on semi-persistent transmissions. FIG. 7A illustrates resource set generation for different reservation periods by an assisting UE in accordance with some embodiments. In FIG. 7A, $P_{RSVP}$=0 is used for resource set generation.

Figure 7B:
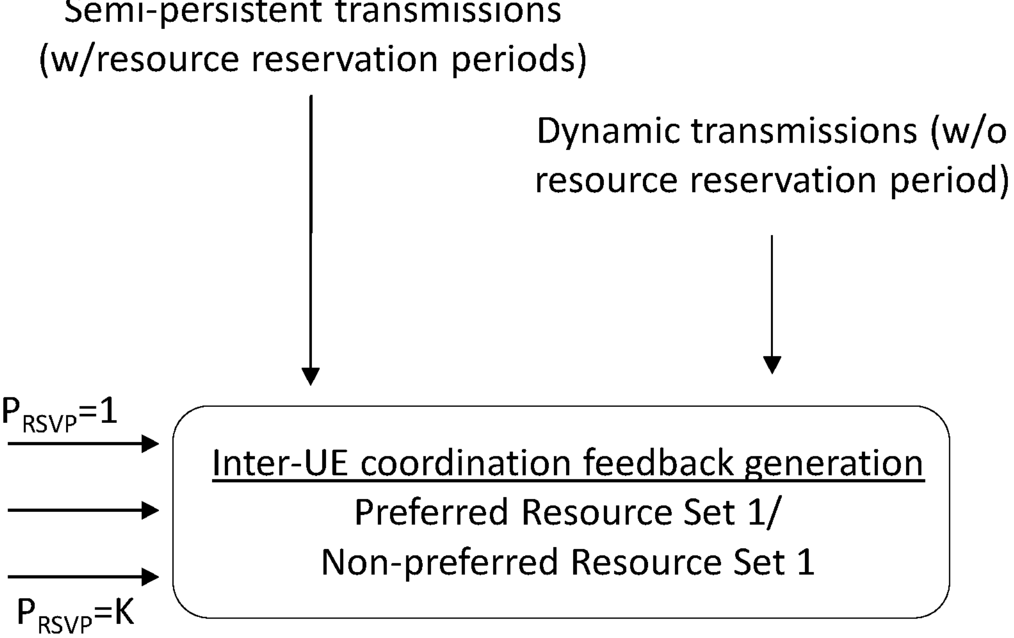
FIG. 7B illustrates another resource set generation for different reservation periods by an assisting UE in accordance with some embodiments.

Case 2. Use all allowed resource reservation periods from the set of $P_{RSVP\_TX}$ for generation of inter-UE coordination feedback and identify the corresponding resource set(s). FIG. 7B illustrates another resource set generation for different reservation periods by an assisting UE in accordance with some embodiments. In FIG. 7B, all $P_{RSVP}$ are used for resource set generation.

Figure 7C:
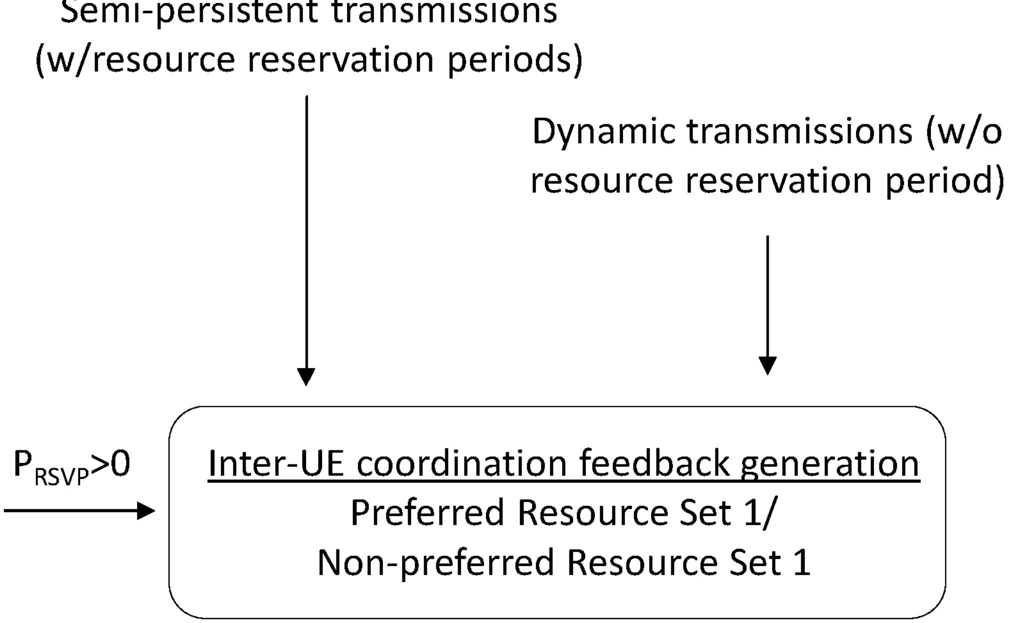
FIG. 7C illustrates another resource set generation for different reservation periods by an assisting UE in accordance with some embodiments.

Case 3. Use a subset of resource reservation periods from the set of allowed $P_{RSVP\_TX}$ for generation of inter-UE coordination feedback and identify the corresponding resource set(s). FIG. 7C illustrates another resource set generation for different reservation periods by an assisting UE in accordance with some embodiments. In FIG. 7C, a subset of $P_{RSVP}$ are used for resource set generation.

In both cases (Case 2 and Case 3), the UE can report resource set(s) separately for each considered value of resource reservation period or for all considered resource reservation periods.

Figure 5B:
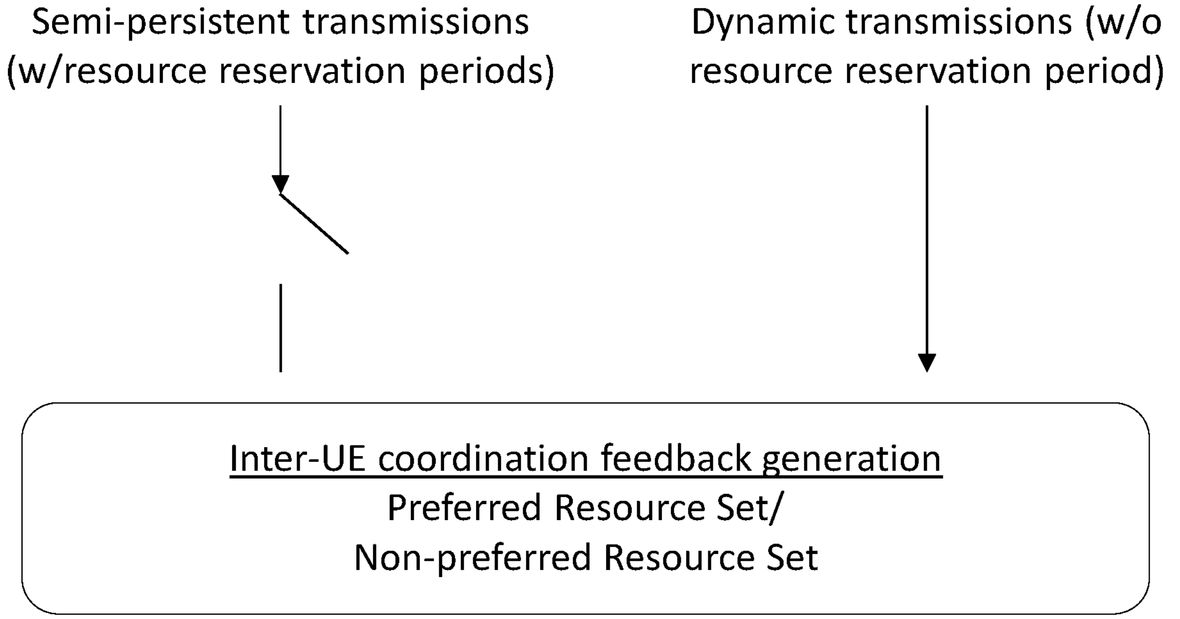
FIG. 5B illustrates another inter-UE coordination feedback generation in accordance with some embodiments.

Option 2B: Inter-UE coordination feedback is enabled for dynamic and disabled for semi-persistent transmissions. Semi-persistent transmissions are ignored, and only dynamic transmissions are used for generation of inter-UE coordination feedback (resource set) for sidelink conflict avoidance. This is a worst case in terms of the use of inter-UE coordination feedback for both semi-persistent and dynamic transmissions and thus in some cases may not be used in a practical implementation. FIG. 5B illustrates another inter-UE coordination feedback generation in accordance with some embodiments. In FIG. 5B, inter-UE coordination feedback is enabled for dynamic and disabled for semi-persistent transmissions.

Figure 5C:
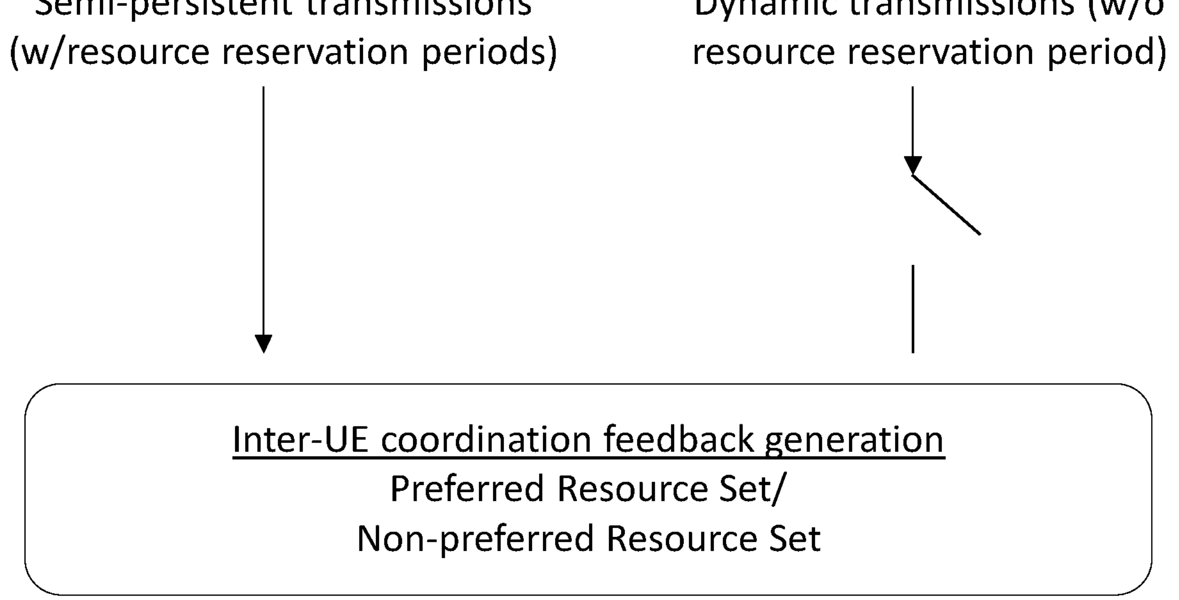
FIG. 5C illustrates another inter-UE coordination feedback generation in accordance with some embodiments.

Option 2C: Inter-UE coordination feedback is enabled for semi-persistent and disabled for dynamic transmissions. Semi-persistent transmissions are treated, and dynamic ones are ignored for generation of inter-UE coordination feedback (resource set(s)) for sidelink conflict avoidance. In this case, the use of inter-UE coordination feedback is suboptimal for both dynamic and semi-persistent transmission. However, the feedback aging time is much longer, and the feedback provides useful information to avoid sidelink conflicts with semi-persistent allocations. Like in Alt.2A, the assisting UE may provide resource sets for different values of allowed reservation periods, or the values requested by the TX UE. FIG. 5C illustrates another inter-UE coordination feedback generation in accordance with some embodiments. In FIG. 5C, inter-UE coordination feedback is for disabled dynamic and enabled for semi-persistent transmissions.

The enabling/disabling of inter-UE coordination feedback as well as inter-UE coordination feedback for semi-persistent or dynamic transmissions can be controlled through sidelink resource pool configuration parameters and pre-configured to UEs.

The use of dynamic transmissions for inter-UE coordination feedback implies a fast aging/outdate time of feedback information for the indicated resource set. The aging in case of semi-persistent transmissions can be much longer. The aging aspects should be considered by the TX UEs that select resources for potential sidelink transmissions considering inter-UE coordination feedback from the assisting UEs. The aging aspect implies that the assisting UE (providing inter-UE coordination feedback) can also indicate information on whether feedback was generated based on dynamic or semi-persistent transmissions. The latter can be associated with a pre-defined aging time that may be dependent on an allowed set of semi-persistent sidelink transmission periods (e.g., associated with the minimum or maximum period), or a pre-configured aging value can be separately provided. Alternatively, the assisting UE can either directly indicate the aging time or the aging time can be pre-configured to UEs or pre-defined by specification.

The feedback aging time can be used by the TX UE to determine whether inter-UE coordination feedback provided on a resource set remains valid or not (i.e., can be used to improve resource selection) and whether the inter-UE coordination feedback can be considered for resource selection.

Inter-UE Coordination Feedback Reference Time and Aging Information

Reference Timing Associated with Inter-UE Coordination Feedback (Resource Set(s))

Figure 8:
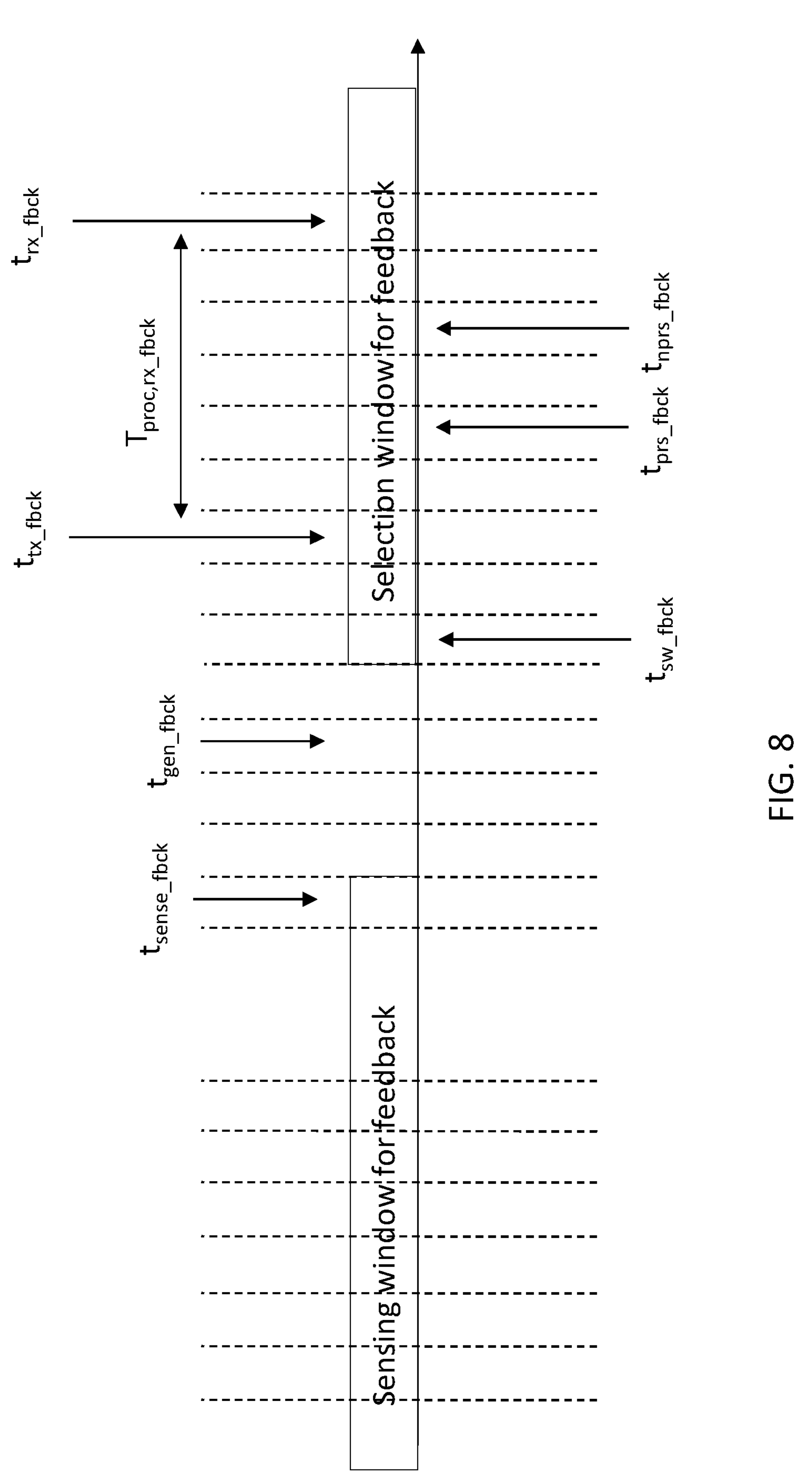
FIG. 8 illustrates assisting UE timings for generation and transmission of inter-UE coordination feedback in accordance with some embodiments.

The preferred/non-preferred resource sets are associated with a reference time instance (timestamp e.g., frame/slot/symbol index) that can be used to associate resources in indicated resource sets with physical sidelink resources and to decide whether information in the report can be used/useful for resource selection (i.e., is not outdated). FIG. 8 illustrates assisting UE timings for generation and transmission of inter-UE coordination feedback in accordance with some embodiments. In general, preferred/non-preferred resource set can be associated with some reference time that can be:

Feedback Generation Time/End of Sensing Time.

This is a time instance (e.g., frame/subframe/slot/symbol index) when the inter-UE coordination feedback (resource set(s)) was generated by a UE—e.g., denoted $t_{gen\_fbck}$. In this case, the UE can directly indicate $t_{gen\_fbck}$ or indicate the last sidelink slot that was sensed $t_{sense\_fbck}$ to generate inter-UE coordination reports with preferred/non-preferred resource set(s).

Let's denote $t_{gen\_fbck}=t_{sense}+T_{gen\_fbck}$, where $T_{gen\_fbck}$ is an actual processing time to prepare a feedback report by a given UE. The $T_{gen\_fbck}$ starts from the last sensed sidelink slot and may accommodate already defined processing times $T_0$ (PSCCH decoding) and $T_1$ (processing of sensing information), which are subject to predefined bounds $T_{proc,0}$ and $T_{proc,1}$.

In one example $T_{gen\_fbck}=T_0+T_1 \le T_{proc,\ gen\_fbck} \le T_{proc,0}+T_{proc,1}$. If the processing time $T_1$ accommodates PSSCH preparation time $T_{TX}$, then $T_{gen\_fbck}$ can be written as $T_{gen\_fbck}=T_0+T_1-T_{TX} \le T_{proc,\ gen\_fbck} \le T_{proc,0}+T_{proc,1}$.

The actual $T_{gen\_fbck}$ time is UE-specific (like $T_0$, $T_1$ and is subject to processing time requirements/bound). Therefore, directly indicating the last sidelink slot $t_{sense}$ that was sensed for feedback preparation is a more reasonable approach for inter-UE coordination feedback than an indication of $t_{gen\_fbck}$ time, otherwise $t_{sense}$ may be unknown to the TX-UE due to a U-specific $T_0$, $T_1$. The resources in generated resource sets may be defined with respect to the last sensing slot $t_{sense}$ using relative time offsets. In another embodiment, the resources in generated resource sets may be defined relative to $t_{gen\_fbck}$.

Feedback Transmission Time

This is a time instance (e.g., frame/subframe/slot/symbol index) corresponding to the initial transmission of the inter-UE coordination feedback $t_{tx\_fbck}$ containing the preferred/non-preferred resource set. The transmission and generation times of inter-UE coordination feedback are coupled with each other through a time offset $t_{tx\_fbck}=t_{gen\_fbck}+T_{prep\_fbck}$. The $T_{prep\_fbck}$ is max (1, $T_{TX\_PSSCH}$ preparation time). Alternatively, the initial feedback transmission time may be coupled directly with the last sensed slot $t_{tx\_fbck}=t_{sense\_fbck}+T_{tx\_fbck}$. The $T_{tx\_fbck}$ is the time from the last sensed slot to the initial transmission of inter-UE coordination feedback. The time difference $T_{tx\_fbck}=t_{tx\_fbck}-t_{sense\_fbck}$ should be bounded by $T_{proc,\ tx\_fbck}$ to provide the freshest sensing information:

$T_{tx\_fbck}=t_{tx\_fbck}-t_{sense\_fbck} \le T_{proc,\ tx\_fbck} \le T_{proc,0}+T_{proc,1}$, if $T_{proc,1}$ includes PSSCH preparation time.

$T_{tx\_fbck}=t_{tx\_fbck}-t_{sense\_fbck} \le T_{proc,\ tx\_fbck} \le T_{proc,0}+T_{proc,1}+T_{proc,Tx}$, if $T_{proc,1}$ does not include PSSCH preparation time, here $T_{proc,TX}$ is the upper bound for PSSCH preparation time.

Alternatively, the boundaries can be defined between $t_{tx\_fbck}$ and $t_{gen\_fbck}$ so that $t_{tx\_fbck}-t_{gen\_fbck} \le T_{proc,\ tx\_fbck}$ to make sure that the generated feedback is reported by the assisting UE immediately (within a limited amount of time) thus reducing the impact of feedback delay. In this case, the assisting UE is expected to continuously select a resource for feedback transmission and perform feedback preparation.

Given that the UE may fail to receive the initial transmission, the association of the resource set (preferred or non-preferred) with the initial transmission time instance may introduce some uncertainty and therefore the direct indication of $t_{gen\_fbck}$ or $t_{sense\_fbck}$ or $t_{tx\_fbck}$ may be preferred to avoid uncertainty.

Resource Selection Window Start Time

This is a time instance (e.g., frame/slot/symbol index) corresponding to the start time of resource selection window $t_{sw\_fbck}$ applied for inter-UE coordination feedback generation. The start time of the resource selection window $t_{sw\_fbck}$ for feedback can be associated with $t_{sense\_fbck}$, $t_{gen\_fbck}$, $t_{tx\_fbck}$. The boundary between $t_{sw\_fbck}$ and $t_{sense\_fbck}$ was defined for sidelink communication: $T_{sw}=t_{sw\_fbck}-t_{sense\_fbck}=(T_0+T_1) \le T_{proc,0}+T_{proc,1}$:

$T_{sw}=t_{sw\_fbck}-t_{sense\_fbck} \le T_{proc,\ sw} \le T_{proc,0}+T_{proc,1}$, if $T_{proc,1}$ includes PSSCH preparation time $T_{sw}=t_{sw\_fbck}-t_{sense\_fbck} \le T_{proc,\ sw} \le T_{proc,0}+T_{proc,1}+T_{proc,TX}$, if $T_{proc,1}$ does not include PSSCH preparation time, here $T_{proc,TX}$ is upper bound for PSSCH preparation time Resource Set Start Time (Preferred/Non-Preferred)

This is a time instance (e.g., frame/slot/symbol index) corresponding to the time of the first resource in reported resource set ($t_{prs\_fbck}$ for preferred resource set and $t_{nprs\_fbck}$ for non-preferred resource set).

Reception Time

This is a time instance (e.g., frame/slot/symbol index) corresponding to the time instance $t_{rx\_time}$ of the inter-UE coordination feedback reception containing carrying resource set. Given that the UE may fail to receive the initial transmission, the association of the reception time may introduce some uncertainty and therefore a direct indication of $t_{sense\_fbck}$, $t_{gen\_fbck}$, $t_{tx\_fbck}$, or $t_{sw\_fbck}$ can be preferred to avoid such uncertainty.

In one embodiment, resources in a preferred/non-preferred resource set can be indicated relative to the reference resource (physical or logical slot index) reported as a part of inter-UE coordination feedback that can be associated with any of the following: $t_{gen\_fbck}$; $t_{sense\_fbck}$; $t_{tx\_fbck}$; $t_{sw\_fbck}$; $t_{nprs\_fbck}$; $t_{prs\_fbck}$; $t_{rx\_fbck}$. The remaining resources can be defined relative to the reference resource.

Figure 9A:
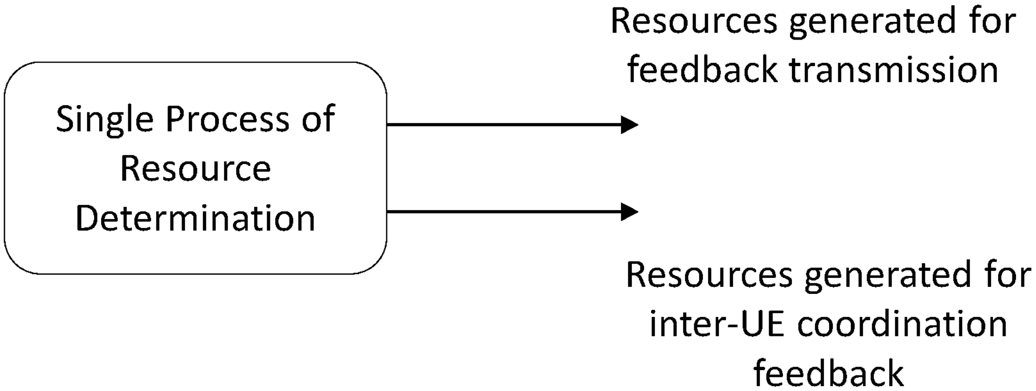
FIG. 9A illustrates inter-UE coordination feedback generation in accordance with some embodiments.

On Sensing and Resource Selection Processes Used for Generation and Transmission of Inter-UE Coordination Feedback The following options can be used for generation and transmission of inter-UE coordination feedback:

Option 1: A single process is used for sensing, resource exclusion and resource selection for both feedback transmission and feedback generation at the assisting UE. This option assumes the same parameters are used for sensing and resource selection to select resources for feedback transmission and determine resource sets (preferred and non-preferred) for feedback. FIG. 9A illustrates inter-UE coordination feedback generation in accordance with some embodiments. In particular, FIG. 9A shows the single process above.

Figure 9B:
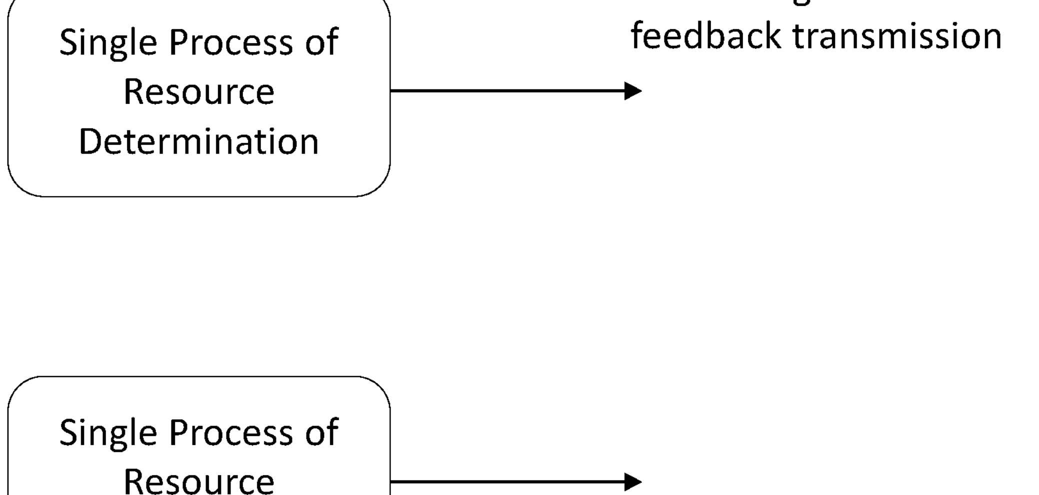
FIG. 9B illustrates another inter-UE coordination feedback generation in accordance with some embodiments.

Option 2: Different/separate processes are used for sensing, resource exclusion and resource selection/determination for feedback transmission and feedback generation at the assisting UE. This option assumes that different parameters are used for sensing and resource selection to select resources for feedback transmission and determine resource sets (preferred and non-preferred) for the inter-UE coordination feedback itself. FIG. 9B illustrates another inter-UE coordination feedback generation in accordance with some embodiments. In particular, FIG. 9B shows the separate processes above. Option 2 may provide more flexibility for inter-UE coordination feedback generation.

Resource Selection Window for Generation/Transmission of Inter-UE Coordination Feedback The resource selection window (SW) for sidelink communication is defined by $[n+T_1, n+T_2]$, which can be written in an alternative form as $[t_{sw\_fbck}, t_{sw\_fbck}+\text{sw\_duration}]$, where $t_{sw\_fbck}=n+T_1$, $\text{sw\_duration}=(T_2-T_1)+1$.

Start Time of Resource Selection Window for Generation/Transmission of Inter-UE Coordination Feedback The start of the resource selection window $t_{sw\_fbck}$ for feedback generation is determined:

Option 1: Relative to time instance n associated with the resource selected and used for the initial sidelink transmission carrying inter-UE coordination feedback and denoted by $t_{tx\_fbck}$ (i.e., $t_{tx\_fbck}=n$).

$t_{sw\_fbck}=t_{tx\_fbck}+\Delta_{sw\_fbck}$, where $\Delta_{sw\_fbck}$ is the time offset of resource selection window relative to the resource selected and used for feedback transmission $0\leq\Delta_{sw\_fbck}\leq\Delta_{sw\_fbck\_max}$.

Figure 10A:
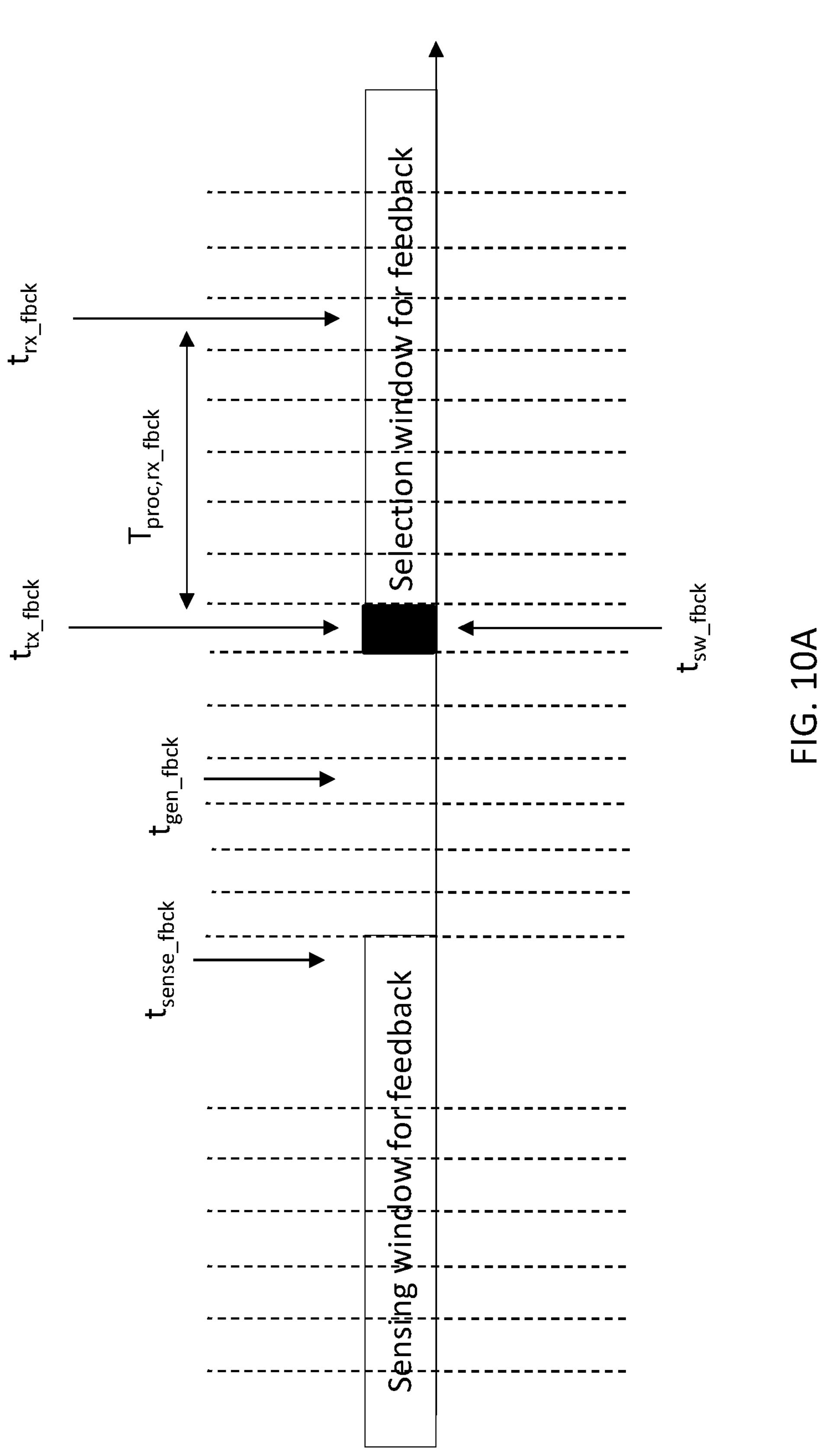
FIG. 10A illustrates allocation of resource selection window for feedback relative to feedback transmission time instance in accordance with some embodiments.

Option 1A: $t_{sw\_fbck}=t_{tx\_fbck}$, i.e., $\Delta_{sw\_fbck}=0$. The selection window starts at the time that the resource is selected and used for the initial sidelink transmission carrying inter-UE coordination feedback. FIG. 10A illustrates allocation of resource selection window for feedback relative to feedback transmission time instance in accordance with some embodiments. In particular, FIG. 10A shows option 1A.

Figure 10B:
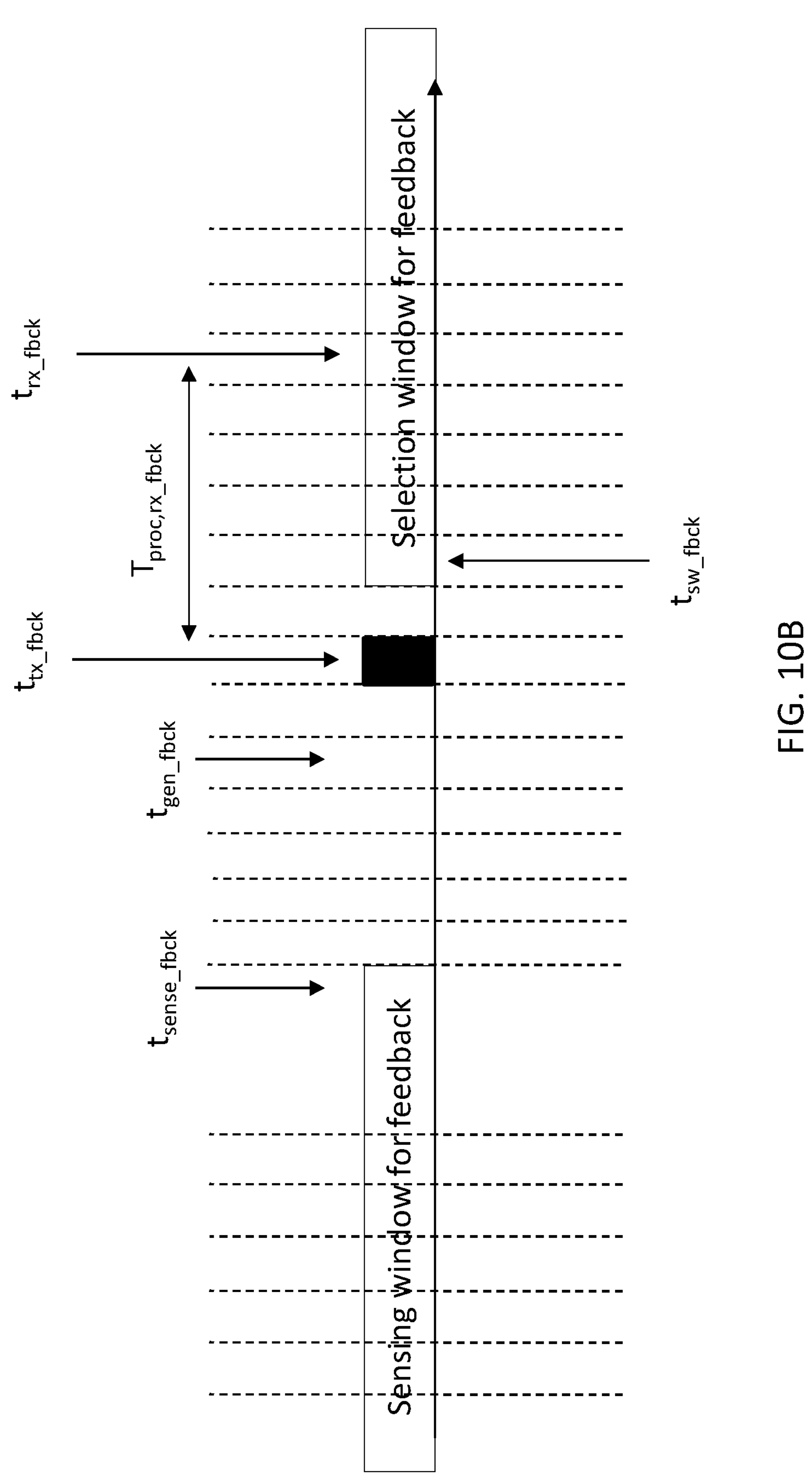
FIG. 10B illustrates another allocation of resource selection window for feedback relative to feedback transmission time instance with some embodiments.

Option 1B: $t_{sw\_fbck}=t_{tx\_fbck}+\Delta_{sw\_fbck}$. The selection window starts after the time that the resource is selected and used for the initial sidelink transmission carrying inter-UE coordination feedback. FIG. 10B illustrates another allocation of resource selection window for feedback relative to feedback transmission time instance with some embodiments. In particular, FIG. 10B shows option 1B.

Figure 10C:
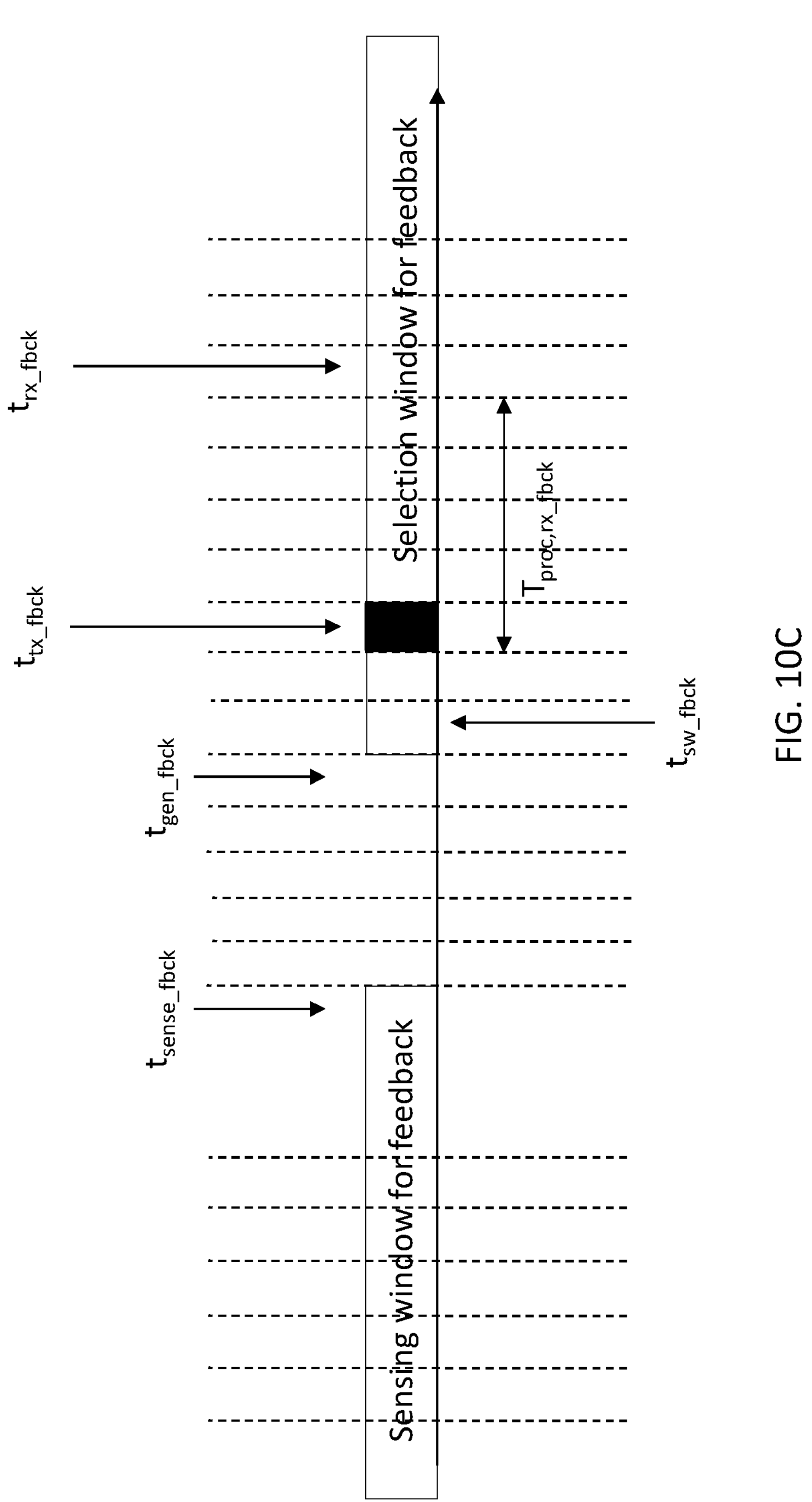
FIG. 10C illustrates another allocation of resource selection window for feedback relative to feedback transmission time instance with some embodiments.

Option 1C: $t_{sw\_fbck}=t_{tx\_fbck}-\Delta_{sw\_fbck}$. The selection window starts before the time that the resource is selected and used for the initial sidelink transmission carrying inter-UE coordination feedback. FIG. 10C illustrates another allocation of resource selection window for feedback relative to feedback transmission time instance with some embodiments. In particular, FIG. 10C shows option 1C.

Option 2: Relative to time instance n determined by the trigger $t_{trigger\_fbck}$ provided by higher layers and used to trigger feedback generation (i.e., $t_{trigger\_fbck}=n$).

$t_{sw\_fbck}=t_{trigger\_fbck}+\Delta_{sw\_fbck}$, where $\Delta_{sw\_fbck}$ is the time offset of the resource selection window relative to trigger time instance $0\leq\Delta_{sw\_fbck}\leq\Delta_{sw\_fbck\_max}$.

Transmission of inter-UE coordination feedback can be subject to $|t_{tx\_fbck}-t_{trigger\_fbck}|<T_{tx\_fbck\_delay}$, where $T_{tx\_fbck\_delay}$, can be a configurable transmission feedback delay provided by higher layers. The $T_{tx\_fbck\_delay}$ can be different for different sidelink transmission priority levels.

Transmission feedback delay $T_{tx\_fbck\_delay}$ can be associated with a configurable sidelink transmission priority level, pre-defined or pre-configured.

Option 2A: $t_{sw\_fbck}=t_{trigger\_fbck}$, i.e., $\Delta_{sw\_fbck}=0$, aligned with trigger.

Option 2B: $t_{sw\_fbck}=t_{trigger\_fbck}+\Delta_{sw\_fbck}$, after the trigger.

Option 2C: $t_{sw\_fbck}=t_{trigger\_fbck}-\Delta_{sw\_fbck}$, before the trigger.

Option 3: Relative to time instance n determined by the trigger $t_{trigger\_tx}$ provided by higher layers and used to trigger resource selection for a sidelink transmission carrying inter-UE coordination feedback (i.e., $t_{trigger\_tx}=n$).

$t_{sw\_fbck}=t_{trigger\_tx}+\Delta_{sw\_fbck}$, where $\Delta_{sw\_fbck}$ is a time offset of the resource selection window relative to the time instance of the trigger activating the resource selection for a sidelink transmission carrying inter-UE coordination feedback, $0\leq\Delta_{sw\_fbck}\leq\Delta_{sw\_fbck\_max}$.

Option 3A: $t_{sw\_fbck}=t_{trigger\_tx}$, i.e., $\Delta_{sw\_fbck}=0$, aligned with the trigger.

Option 3B: $t_{sw\_fbck}=t_{trigger\_tx}+\Delta_{sw\_fbck}$, after the trigger.

Option 3C: $t_{sw\_fbck}=t_{trigger\_tx}-\Delta_{sw\_fbck}$, before the trigger.

Duration of Resource Selection Window for Generation of Inter-UE Coordination Feedback The duration of the resource selection window for inter-UE coordination feedback generation sw_duration=$(T_{2,fbck}-T_{1,fbck})+1$ or $T_{2,min,fbck}$ can be determined by:

Option 0: (Same as for sidelink communication)

Determined by the assisting UE in the same way as for resource selection for sidelink communication, i.e. the following parameters are determined in the same way as for sidelink communication $T_{2,fbck}=T_2\leq T_{2,\ min}$; $T_{1,fbck}=T_1\leq T_{proc,1}$; $T_{2,min,fbck}=T_{2,min}$ Option 1: Determined by the assisting UE Option 1A: determined from the set of pre-configured values Option 1B: determined from the set of pre-configured values for different sidelink transmission priority levels Option 1C: autonomously determined subject to satisfying a minimum resource selection window for feedback and processing times Option 2: Configured by the TX-UE requesting inter-UE coordination feedback Option 2A: configured from the set of pre-configured values Option 2B: configured from the set of pre-configured values corresponding sidelink transmission priority levels Option 2C: autonomously determined subject to a minimum/maximum resource selection window for feedback Option 3: Pre-configured or pre-defined to assisting UEs Option 3A: Pre-configured or pre-defined Option 3B: Pre-configured or pre-defined for sidelink priority levels used for feedback transmission Processing Time/Bounds Requirements The following processing time bounds can be defined to reduce feedback delay for transmission Option 1 (Feedback transmission time and end of sensing window/time for feedback generation)

$$t_{tx\_fbck}-t_{sense\_fbck}\leq T_{proc,tx\_sense\_fbck}\leq T_{proc,0\ fbck}+T_{proc,1\ fbck}+T_{proc,2\ fbck}$$

$T_{proc,\ tx\_fbck}$—the maximum processing time from sensing time to feedback transmission time $T_{proc,0\ fbck}$—the SCI/PSCCH decoding processing and SL-RSRP measurement time, can be equivalent to $T_{proc,0}$ in some embodiments $T_{proc,1\ fbck}$—the assisting UE processing time for feedback generation (sensing and resource set generation), can be equivalent to $T_{proc,1}$ in some embodiments $T_{proc,2\ fbck}$—PSCCH/PSSCH preparation time if it is not included in $T_{proc,1\ fbck}$ Option 2 (Feedback transmission time and feedback generation time)

$$t_{tx\_fbck}-t_{gen\_fbck}\leq T_{proc,tx\_gen\_fbck}$$

$T_{proc,\ tx\_gen\_fbck}$—maximum allowed processing time from the feedback generation time to the feedback transmission time, can be equivalent to PSCCH/PSSCH preparation time in some embodiments Option 3 (Start time of resource selection window and end time of sensing window for feedback generation)

$$t_{sw\_fbck}-t_{sense\_fbck}\leq T_{proc,sw\_sense\_fbck}$$

$T_{proc,\ sw\_sense\_fbck}$—the maximum allowed processing time from the end of sensing window to the resource selection window. In some embodiments $T_{proc,\ sw\_sense\_fbck} \le T_{proc,0\ fbck} + T_{proc,1\ fbck}$ $T_{proc,0\ fbck}$—the SCI/PSCCH decoding processing time and can be equivalent to $T_{proc,0}$ in some embodiments $T_{proc,1\ fbck}$—the processing time for feedback generation (sensing and resource set generation) and can be equivalent to $T_{proc,1}$ in some embodiments Option 4 (Start time of resource selection window and feedback transmission time)

$$t_{tx\_fbck} - t_{sw\_fbck} \le T_{proc,tx\_sw\_fbck}$$

$T_{proc,\ tx\_sw\_fbck}$—the maximum processing time from the start of resource selection window to the feedback transmission time Sensing Window for Generation/Transmission of Inter-UE Coordination Feedback End Time of Sensing Window for Generation of Inter-UE Coordination Feedback ($t_{sense\_fbck}$)

The sensing window for sidelink communication is defined by $[n-T_0, n-T_{proc,0})$ or alternatively the sensing window can be represented in the form $[t_{sense\_fbck}-T_0, t_{sense\_fbck}]$ or $[t_{sense\_fbck}, t_{sense\_fbck}+T_0]$.

The end time (frame/subframe/slot/symbol index) of the sensing window $t_{sense\_fbck}$ for feedback generation is determined Option 0: Relative to start of resource selection window for feedback generation $$t_{sense\_fbck} = t_{sw\_fbck} - \Delta_{sense\_fbck};\ 0 \le \Delta_{sense\_fbck} \le \Delta_{sense\_fbck\_max}$$

Option 1: Relative to time instance n associated with the resource selected and used for the initial sidelink transmission carrying the inter-UE coordination feedback and denoted by $t_{tx\_fbck}$ $t_{sense\_fbck} = t_{tx\_fbck} - \Delta_{sense\_fbck}$, where $\Delta_{sense\_fbck}$ is the time offset relative to the resource selected and used for the initial sidelink transmission carrying feedback: $0 < \Delta_{sense\_fbck} \le \Delta_{sense\_fbck\_max}$ Option 2: Relative to time instance n determined by the trigger $t_{trigger\_fbck}$ provided by higher layers and used to trigger feedback generation $t_{sense\_fbck} = t_{trigger\_fbck} - \Delta_{sense\_fbck}$, where $\Delta_{sense\_fbck}$ is the time offset relative to the trigger time instance used to trigger the feedback generation: $0 < \Delta_{sense\_fbck} \le \Delta_{sense\_fbck\_max}$ Option 3: Relative to time instance n determined by the trigger $t_{trigger\_tx}$ provided by higher layers and used to trigger resource selection for the sidelink transmission carrying the inter-UE coordination feedback $t_{sense\_fbck} = t_{trigger\_tx} - \Delta_{sense\_fbck}$, where $\Delta_{sense\_fbck}$ is the time offset relative to trigger the time instance used to trigger resource selection for the feedback transmission: $0 < \Delta_{sense\_fbck} \le \Delta_{sense\_fbck\_max}$ Duration of Sensing Window for Generation of Inter-UE Coordination Feedback Sensing window duration for inter-UE coordination feedback can be determined by:

Option 1: Determined by the assisting UE

Option 1A: determined from the set of pre-configured values

Figure 11A:
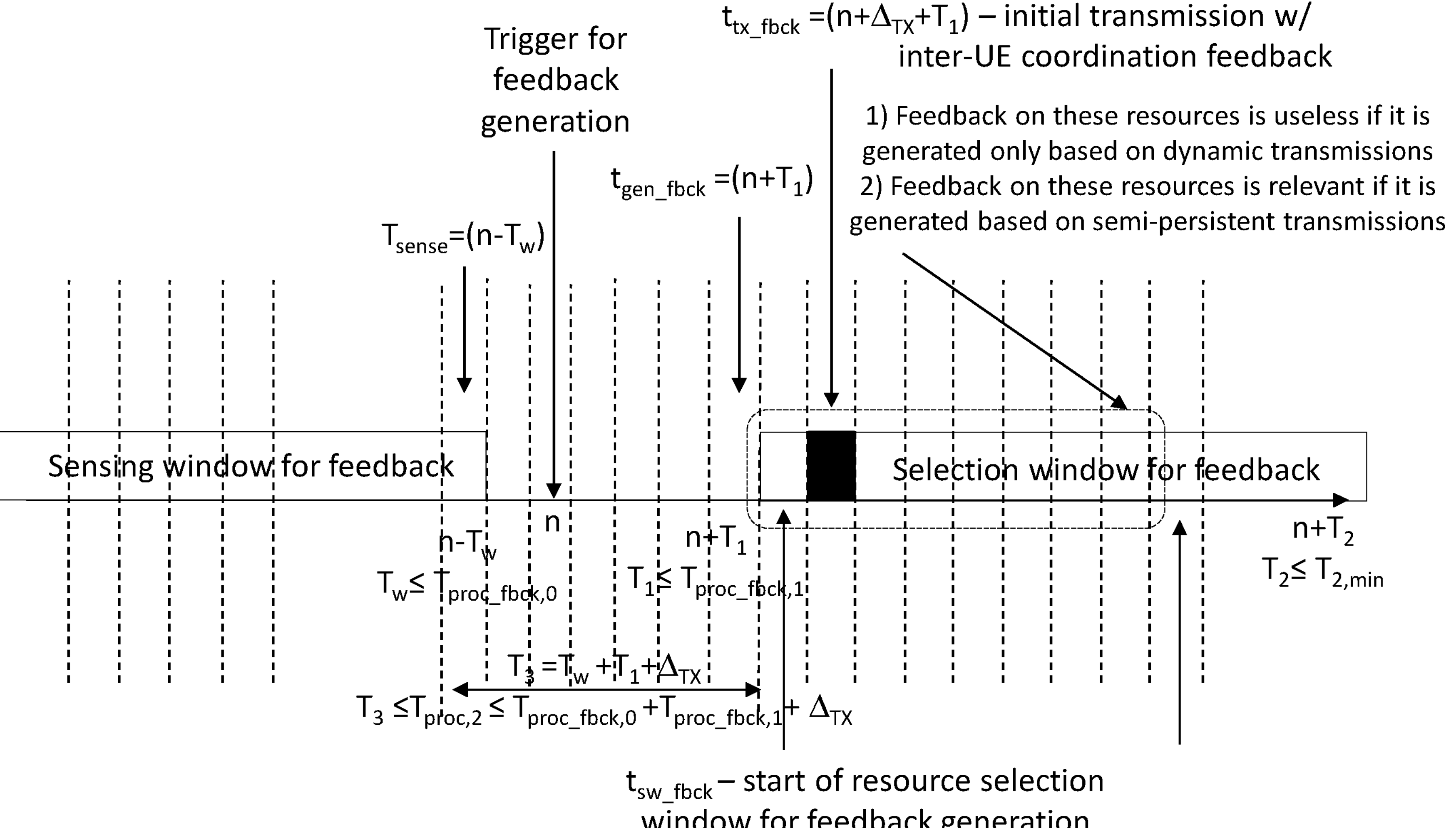
FIG. 11A illustrates a resource selection window for feedback precedes time instance for feedback transmission in accordance with some embodiments.

Option 1B: determined from the set of pre-configured values for different sidelink transmission priority levels Option 1C: autonomously determined subject to a minimum sensing window for feedback Option 2: Configured by the TX-UE requesting inter-UE coordination feedback Option 2A: configured from the set of pre-configured values Option 2B: configured from the set of pre-configured values corresponding sidelink transmission priority levels Option 2C: autonomously determined subject to a minimum/maximum sensing window for feedback generation Option 3: Pre-configured or pre-defined for assisting UEs Option 3A: Pre-configured or pre-defined Option 3B: Pre-configured or pre-defined for sidelink priority levels used for feedback transmission Start of Resource Selection Window for Feedback Generation Relative to Feedback Transmission The start of the resource selection window for the inter-UE coordination feedback may be allocated:

Option 1: Before (or equal to) the feedback transmission time, i.e., $t_{sw\_fbck} \le t_{tx\_fbck}$. FIG. 11A illustrates a resource selection window for feedback precedes time instance for feedback transmission in accordance with some embodiments. In particular, FIG. 11A shows option 1.

In this case, feedback information for resources within the time interval $[t_{sw\_fbck}, t_{tx\_fbck}+T_{rx\_fbck}]$ may be irrelevant since when the TX UE received feedback, these resources have already passed in time and cannot be selected. The reported feedback can exclude at least resources that are not considered by the TX-UE due to processing time restrictions ($T_{proc,0}$; $T_{proc,1}$).

However, it is correct only if dynamic transmissions were considered for generation of inter-UE coordination feedback. If semi-persistent transmissions were used for feedback generation on these resources, then information in feedback can be still relevant.

Here $T_{rx\_fbck}$ is the feedback processing and application time at the receiver side. $T_{rx\_fbck}$ includes HARQ retransmissions delays, $T_{HARQ\_fbck}$, PSCCH/PSSCH decoding time $T_{0,fbck}$, that can be equivalent to $T_{proc,0}$ in some embodiments, Receiver feedback processing/application delay—denoted by $T_{1,fbck}$, which can be equivalent to $T_{proc,1}$ in some embodiments or a new processing time can be defined.

Figure 11B:
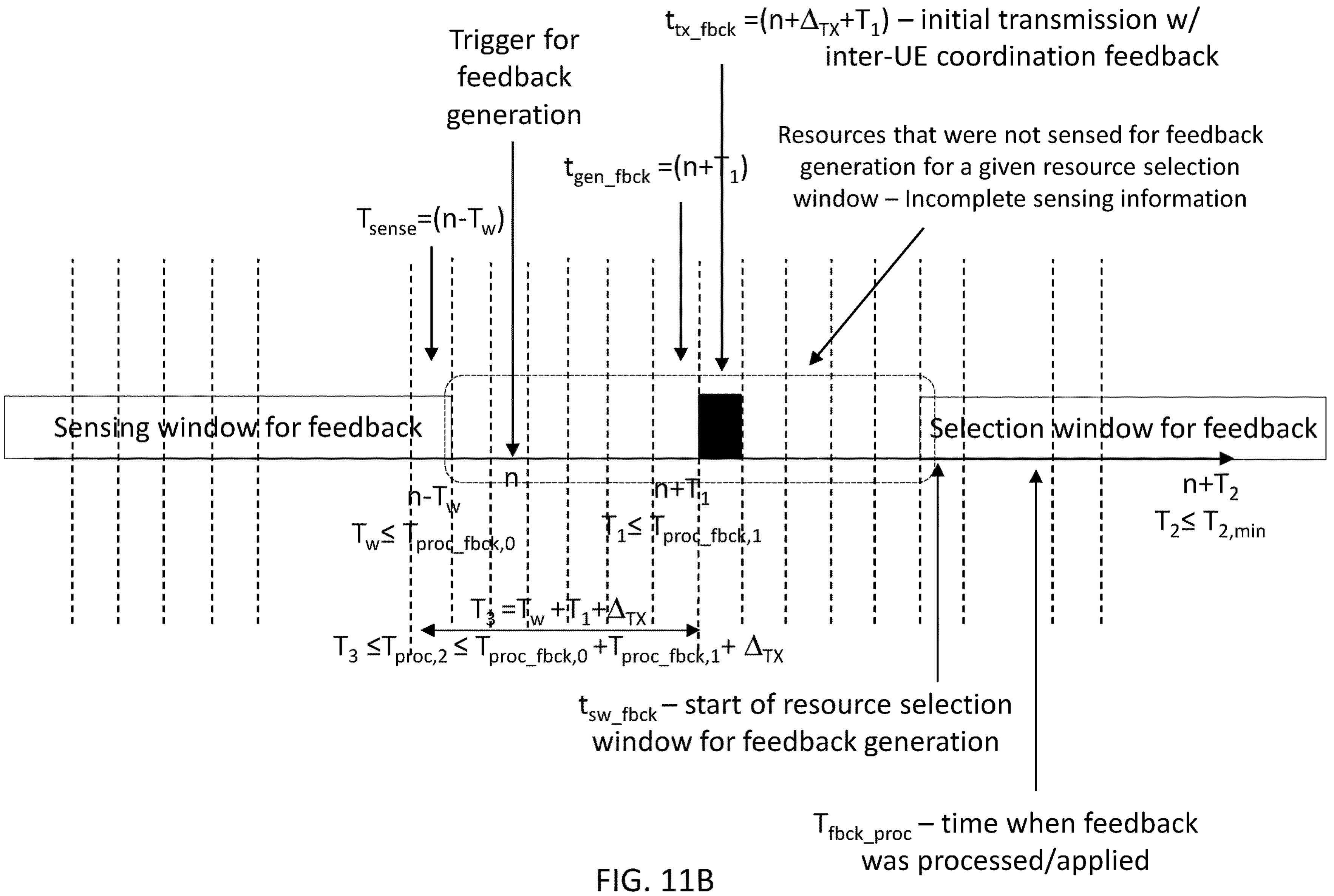
FIG. 11B illustrates another resource selection window for feedback allocated after time instance for feedback transmission in accordance with some embodiments.

Option 2: After feedback transmission time, i.e., $t_{tx\_fbck} \le t_{sw\_fbck}$. FIG. 11B illustrates another resource selection window for feedback allocated after the time instance for feedback transmission in accordance with some embodiments. In particular, FIG. 11B shows option 2.

In this case, the feedback may have some uncertainty since resources within the interval $[t_{tx\_fbck}-(T_{0,fbck}+T_{1,fbck}+T_{2,fbck}), t_{sw\_fbck})]$ were not sensed by the assisting UE and therefore the feedback information is incomplete. In one embodiment, the values for $T_{0,fbck}$; $T_{1,fbck}$; $T_{2,fbck}$ can be bounded by Tproc,0 Tproc,1 Tproc. In another embodiment, new processing limits can be introduced: $T_{proc\_fbck,0}$; $T_{proc\_fbck,1}$; $T_{proc\_fbck,2}$. Note that to support this scenario $T_{1,fbck}$ may be larger than $T_{proc,1}$ (i.e. $T_{1,fbck} > T_{proc,1}$). If $(t_{tx\_fbck}+T_{rx\_fbck}) > t_{tx\_fbck}$, then feedback information for resources within the time interval $[t_{sw\_fbck}, t_{tx\_fbck}+T_{rx\_fbck}]$ may be irrelevant (depending on whether semi-persistent transmissions were considered for feedback generation).

Aging of Inter-UE Coordination Feedback (Resource Set(s))

In the above, either a preferred or non-preferred resource set is expected to be associated with a reference resource time (subframe/slot/symbol index) that can be used to indicate remaining resources in the resource set or determine the last slot that was used for preparation of the inter-UE coordination feedback/report. Besides the reference time, the aging of inter-UE coordination feedback (reported information) should be determined to decide whether to use the report in resource selection.

Inter-UE coordination feedback has multiple delays that contribute to its aging time, determined by current feedback delay. Feedback aging time (current feedback delay) $t_{aging}$ can be defined relative to:

Option 1: Relative to the last sensing slot that was used for feedback preparation, i.e., relative to $t_{sense\_fbck}$ or relative to ($t_{sense\_fbck}+\Delta$), where $\Delta$ is a time offset known to the UE.

$t_{agging}=t_{curr}-t_{sense\_fbck}$, where $t_{curr}$ is the current time applied for aging evaluation, here $\Delta=0$;

Option 2: Relative to the start of resource selection window for feedback i.e., relative to $t_{sw\_fbck}$ or relative to ($t_{sw\_fbck}+\Delta$), where $\Delta$ is a time offset known to the UE.

$t_{agging}=t_{curr}-t_{sw\_fbck}$, where $t_{curr}$ is the current time applied for aging evaluation, here $\Delta=0$;

Option 3: Other options are also possible: $t_{gen\_fbck}$; $t_{tx\_fbck}$; $t_{rx\_fbck}$.

Various delays contribute to the aging of inter-UE coordination feedback:

Assisting UE

Feedback generation/preparation delay: the upper bound can be defined for this delay—$T_{proc,\ gen\_fbck}$ Feedback initial transmission delay: the upper bound can be defined for this delay—$T_{proc,\ init\_fbck\_dly}$ Feedback transmission delay budget: can be bounded by $T_{proc,\ fbck\_pdb}$ TX UE Receiving Feedback Feedback retransmission delay (including HARQ transmission delays)

Feedback receive processing delay can be bounded by $T_{proc,\ rx\_fbck}$

Feedback application delay (feedback processing together with TX UE sensing data) can be bounded by $T_{proc,\ appl\_fbck}$ To apply inter-UE coordination feedback for resource selection, the aging time should be less than a pre-configured or pre-defined threshold $T_{fbck\_aging\_thr}$ (i.e., $t_{agging}\leq T_{fbck\_aging\_thr}$). This threshold can be applied either to individual resources in reported resource sets or to the whole resource set provided by the inter-UE coordination feedback. If ($t_{agging}>T_{fbck\_aging\_thr}$), the inter-UE coordination feedback can be dropped.

The threshold $T_{fbck\_aging\_thr}$ can be preconfigured to UEs that use inter-UE coordination feedback to improve resource selection. A pre-configuration can be provided per each resource pool where inter-UE coordination feedback is enabled.

The threshold $T_{fbck\_aging\_thr}$ can be determined based on one or a combination of the following options:

Option 1: Predefined as a function of:

Resource Reservation Periods Allowed for Sidelink Transmission/Semi-Persistent Resource Reservation Minimum configured reservation period in the configured set—$P_{RSVP,\ min}$ Maximum configured reservation period in the configured set—$P_{RSVP,\ max}$ Mean period value of reservation periods in the configured set—$P_{RSVP,\ mean}$ Median period value of reservation periods in the configured set—$P_{RSVP,\ median}$ Pre-Configured Aging Time Value can be pre-configured by the gNB/NW SCI signaling window length, $L_{SCI}$ SCI signaling window in logical slots $L_{SCI,\ logical}$ Minimum SCI signaling window length in physical slots, $L_{SCI,\ min}$ Maximum SCI signaling window length in physical slots, $L_{SCI,\ max}$ Mean SCI signaling window length in physical slots, $L_{SCI,\ mean}$ Median SCI signaling window length in physical slots, $L_{SCI,\ median}$ Resource Selection Window Length for Feedback Generation Pre-Configured Probability to Keep Selected Resource Type of Inter-UE Coordination Feedback Constructions Option 2: Pre-configured Pre-configured system-wide by gNB/NW/application layer for each sidelink resource pool Pre-configuration can be done for each type of inter-UE coordination feedback Option 3: Determined by assisting UE: the assisting UE during sensing can determine aging time based on transmission periods from other UEs and report the aging time as a part of the inter-UE coordination feedback Option 4: Determined by TX UE: the TX UE can determine the aging time based on the inter-UE coordination feedback from the assisting UEs and monitored sidelink transmissions from other UEs The aging time of the inter-UE coordination feedback (resource set) can depend on the way the inter-UE coordination feedback was constructed. If the resource set is constructed considering semi-persistent transmissions only, then the aging time can be longer comparing to the case of dynamic transmissions, especially if only long transmission periods were allowed by configuration for resource reservations. More than one aging threshold can be configured to the UE, e.g., one aging threshold for inter-UE coordination feedback constructed based on dynamic transmissions and another aging threshold for inter-UE coordination feedback constructed based on semi-persistent transmissions.

Based on R16/R17 SCI signaling design for dynamic sidelink transmissions, the complete aging is achieved in N slots after the last sensed slot and the aging is determined by the SCI signaling window range (e.g., N=32). For semi-persistent transmissions, the aging depends on the configured set of reservation periods and the number of semi-persistent transmissions per transmission block (TB) without resource reselection.

Aging time $T_{aging}$ or threshold used for aging $T_{fbck\_aging\_thr}$ can be a function of multiple arguments:

$T_{aging}$=f(resource pool configuration, SCI signaling window (duration), set of semi-persistent period(s) for transmission/reservation, inter-UE coordination feedback type and delay)

Pool configuration—sidelink resource pool configuration may imply that not all slots are allocated for sidelink transmission, and thus logical and physical sidelink slot indexes may be used to define aging time (e.g. in case of dynamic transmissions it will be 32 logical slots)

SCI signaling window (duration)—a single SCI can allocate a sidelink transmission over a time interval accommodating up to 32 logical slots for transmission of a given TB. In this case, $T_{aging_dynamic}\leq$SCI signaling window duration measured in logical slots.

Set of semi-persistent transmission periods—the aging time may depend on a pre-configured set of semi-persistent transmission/reservation periods (e.g., a minimum transmission/reservation period), a transmission/reservation period used by the TX UE or a transmission period applied by the assisting UE for a sensing operation to provide the inter-UE coordination feedback. $T_{aging\_sp}$≥SCI signaling window duration in logical slots for semi-persistent transmissions, if the minimum transmission/reservation period is larger than SCI signaling window duration; $T_{aging\_sp}$≤SCI signaling window in logical slots for small periods, if the minimum transmission period is smaller than SCI signaling window.

The sensing procedure applied for inter-UE coordination feedback (e.g., whether semi-persistent and/or dynamic transmissions were considered for construction of preferred/non-preferred resource sets). Preconfigured parameters for the aging time (e.g., the maximum aging time for the case of dynamic transmissions and the maximum aging time for the case of semi-persistent transmissions).

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE), configured for operating in a fifth-generation new radio (5G NR) network, the apparatus comprising:

processing circuitry; and memory, the processing circuitry configured to:

decode higher-layer signalling received from the 5G NR network comprising sidelink configuration information for inter-UE coordination (IUC);

decode sidelink control information received from a peer UE comprising an inter-UE coordination request for inter-UE coordination related information;

determine resources for reception of a sidelink transmission from the peer UE based on parameters provided by the higher-layer signalling in response to the inter-UE coordination request received from the peer UE; and decode the sidelink transmission received from the peer UE on the resources determined for the sidelink transmission, the sidelink transmission based on the sidelink configuration information, wherein to determine the resources for the sidelink transmission by the peer UE, the processing circuitry is configured to:

consider resources within a resource selection window indicated in the inter-UE coordination request; and exclude resources with expected or potential resource conflicts from the resources indicted by the sidelink control information received from the peer UE.

2. The apparatus of claim 1, wherein the processing circuitry is configured to encode sidelink control information for transmission to the peer UE indicating the resources determined for the sidelink transmission.

3. The apparatus of claim 2, wherein to exclude resources with expected or potential resource conflicts, the processing circuitry is configured to exclude resources in slots where the UE does not expect to perform sidelink reception due to half-duplex operation.

4. The apparatus of claim 3, wherein the inter-UE coordination request indicates one of a preferred resource set and a non-preferred resource set; and wherein the processing circuitry is configured to determine the resources for the sidelink transmission by the peer UE from one of the preferred or non-preferred resource set based on the inter-UE coordination request.

5. The apparatus of claim 4, wherein the processing circuitry is configured to apply a different reference signal receive power (RSRP) threshold for determining resources for the sidelink transmission when the non-preferred resource set is indicated than when the preferred resource set is indicated.

6. The apparatus of claim 2, wherein the sidelink control information transmitted to the peer UE further comprises resource location of the resources for the sidelink transmission by the peer UE.

7. The apparatus of claim 2, wherein the sidelink control information received from the peer UE further comprises a location of the resource selection window.

8. The apparatus of claim 2, wherein the processing circuitry is further configured to determine resources for reception of a sidelink transmission from the peer UE based on parameters provided by the higher-layer signalling to avoid collisions and/or conflicts.

9. The apparatus of claim 2, wherein the processing circuitry is configured to determine expected and/or potential resource conflict within resources indicated by the sidelink control information received from the peer UE as either:

resources reserved by other UEs and determined by the UE to be fully or partially overlapping with the resources indicated by the sidelink control information received from the peer UE; or slots where the UE is an intended receiver of a sidelink transmission from the peer UE and does not expect to perform sidelink reception on those slots due to half-duplex operation.

10. The apparatus of claim 1, wherein the sidelink transmission received from the peer UE comprises a Vehicle-to-Everything (V2X) communication.

11. A non-transitory computer-readable storage medium that stores instructions for execution by processing circuitry of a user equipment (UE) configured for operating in a fifth-generation new radio (5G NR) network, the processing circuitry configured to:

decode higher-layer signalling received from the 5G NR network comprising sidelink configuration information for inter-UE coordination (IUC);

decode sidelink control information received from a peer UE comprising an inter-UE coordination request for inter-UE coordination related information;

determine resources for reception of a sidelink transmission from the peer UE based on parameters provided by the higher-layer signalling in response to the inter-UE coordination request received from the peer UE; and decode the sidelink transmission received from the peer UE on the resources determined for the sidelink transmission, the sidelink transmission based on the sidelink configuration information, wherein to determine the resources for the sidelink transmission by the peer UE, the processing circuitry is configured to:

consider resources within a resource selection window indicated in the inter-UE coordination request; and exclude resources with expected or potential resource conflicts from the resources indicted by the sidelink control information received from the peer UE.

12. The non-transitory computer-readable storage medium of claim 11, wherein the processing circuitry is configured to encode sidelink control information for transmission to the peer UE indicating the resources determined for the sidelink transmission.

13. The non-transitory computer-readable storage medium of claim 12, wherein to exclude resources with expected or potential resource conflicts, the processing circuitry is configured to exclude resources in slots where the UE does not expect to perform sidelink reception due to half-duplex operation.

14. The non-transitory computer-readable storage medium of claim 13, wherein the inter-UE coordination request indicates one of a preferred resource set and a non-preferred resource set; and wherein the processing circuitry is configured to determine the resources for the sidelink transmission by the peer UE from one of the preferred or non-preferred resource set based on the inter-UE coordination request.

15. The non-transitory computer-readable storage medium of claim 14, wherein the processing circuitry is configured to apply a different reference signal receive power (RSRP) threshold for determining resources for the sidelink transmission when the non-preferred resource set is indicated than when the preferred resource set is indicated.

16. The non-transitory computer-readable storage medium of claim 12, wherein the sidelink control information transmitted to the peer UE further comprises resource location of the resources for the sidelink transmission by the peer UE.

17. The non-transitory computer-readable storage medium of claim 12, wherein the sidelink control information received from the peer UE further comprises a location of the resource selection window.

* * * * *